US010173559B2

(12) United States Patent
Tachikawa et al.

(10) Patent No.: US 10,173,559 B2
(45) Date of Patent: Jan. 8, 2019

(54) CONVEYANCE SEAT

(71) Applicant: TS TECH CO., LTD., Asaka, Saitama (JP)

(72) Inventors: Yoichi Tachikawa, Tochigi (JP); Masato Watanabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/140,005

(22) Filed: Apr. 27, 2016

(65) Prior Publication Data

US 2016/0236595 A1 Aug. 18, 2016

Related U.S. Application Data

(62) Division of application No. 14/008,665, filed as application No. PCT/JP2012/058419 on Mar. 29, 2012, now Pat. No. 9,333,884.

(30) Foreign Application Priority Data

Mar. 31, 2011 (JP) .................................. 2011-081071
Mar. 31, 2011 (JP) .................................. 2011-081072
Mar. 31, 2011 (JP) .................................. 2011-081073

(51) Int. Cl.
*B60N 2/856* (2018.01)
*B60N 2/48* (2006.01)
(Continued)

(52) U.S. Cl.
CPC ............. *B60N 2/4855* (2013.01); *B60N 2/02* (2013.01); *B60N 2/206* (2013.01); *B60N 2/309* (2013.01);
(Continued)

(58) Field of Classification Search
None
See application file for complete search history.

(56) References Cited

U.S. PATENT DOCUMENTS 4,335,919 A 6/1982 Nagashima et al.
4,909,571 A 3/1990 Vidwans et al.
(Continued)

FOREIGN PATENT DOCUMENTS

EP 1 810 873 A 7/2007
JP 46-026723 Y1 9/1971
(Continued)

OTHER PUBLICATIONS

Extended European Search Report issued for related application EP 12763573.8, dated Aug. 4, 2014, 7 pages.
(Continued)

*Primary Examiner* — David E Allred
(74) *Attorney, Agent, or Firm* — Drinker Biddle & Reath LLP

(57) ABSTRACT

A conveyance seat includes: a seat base; a support portion which supports the occupant from the back side; a flip-up mechanism which flips up the seat base; a biasing member which biases the support portion forward; an engagement portion which is engaged with the support portion to hold the support portion in a upright state against the biasing force; a cancel mechanism which cancels the engagement between the engagement portion and the support portion; and a return mechanism which returns the support portion from a state where the engagement with the engagement portion is canceled by the cancel mechanism to a state where the support portion is engageable with the engagement portion. The return mechanism performs the return operation in accordance with the inclination angle of the support portion inclined forward by the biasing member after the engagement between the engagement portion and the support portion is canceled.

8 Claims, 19 Drawing Sheets

(51) Int. Cl.
*B60N 2/30* (2006.01)
*B60N 2/36* (2006.01)
*B60N 2/02* (2006.01)
*B60N 2/68* (2006.01)
*B60N 2/20* (2006.01)
*B60N 2/859* (2018.01)
*B60N 2/90* (2018.01)
*B60N 2/897* (2018.01)

(52) U.S. Cl.
CPC ......... *B60N 2/3013* (2013.01); *B60N 2/3043* (2013.01); *B60N 2/3065* (2013.01); *B60N 2/366* (2013.01); *B60N 2/68* (2013.01); *B60N 2/856* (2018.02); *B60N 2/859* (2018.02); *B60N 2/897* (2018.02); *B60N 2002/948* (2018.02)

(56) References Cited

U.S. PATENT DOCUMENTS

| | | | |
|---|---|---|---|
| 5,195,802 A | 3/1993 | Hayakawa et al. | |
| 5,393,121 A | 2/1995 | Reuss et al. | |
| 5,588,707 A | 12/1996 | Bolsworth et al. | |
| 5,681,079 A | 10/1997 | Robinson | |
| 6,012,747 A | 1/2000 | Takamura et al. | |
| 6,196,613 B1 | 3/2001 | Arai | |
| 6,347,836 B1 | 2/2002 | Hayotte | |
| 6,547,302 B1 | 4/2003 | Rubio et al. | |
| 6,568,756 B2 | 5/2003 | Sugimoto et al. | |
| 6,644,730 B2 | 11/2003 | Sugiura et al. | |
| 6,817,669 B2 | 11/2004 | Roth et al. | |
| 6,902,232 B2* | 6/2005 | Kamrath | B60N 2/4858 297/61 |
| 7,201,437 B2 | 4/2007 | Freijy | |
| 7,222,907 B2 | 5/2007 | Lutzka et al. | |
| 7,255,399 B2 | 8/2007 | White et al. | |
| 7,264,293 B2 | 9/2007 | Fischer et al. | |
| 7,325,877 B2* | 2/2008 | Brockman | B60N 2/4844 297/403 |
| 7,338,128 B2 | 3/2008 | Inoue et al. | |
| 7,431,371 B2 | 10/2008 | Miller et al. | |
| 7,431,400 B2* | 10/2008 | Brawner | B60N 2/4808 297/391 |
| 7,758,122 B2 | 7/2010 | Haida et al. | |
| 7,926,858 B2 | 4/2011 | Otsuka | |
| 7,954,898 B2 | 6/2011 | Van De Geer et al. | |
| 7,967,375 B2 | 6/2011 | Yu et al. | |
| 8,047,610 B2 | 11/2011 | Yamaguchi | |
| 8,118,342 B2 | 2/2012 | Kokubo et al. | |
| 8,128,135 B2 | 3/2012 | Maeta et al. | |
| 8,157,320 B2* | 4/2012 | Sayama | B60N 2/3011 297/408 |
| 8,172,330 B2* | 5/2012 | Sayama | B60N 2/4844 297/403 |
| 8,246,116 B1* | 8/2012 | Sutter, Jr. | B60N 2/844 297/408 |
| 8,251,430 B2 | 8/2012 | Ishii et al. | |
| 8,251,450 B2 | 8/2012 | Carroll et al. | |
| 8,282,141 B2 | 10/2012 | Paing et al. | |
| 8,333,530 B2 | 12/2012 | Omori | |
| 8,342,605 B2 | 1/2013 | Tanaka et al. | |
| 8,459,744 B2* | 6/2013 | Sayama | B60N 2/4844 297/408 |
| 8,506,014 B2 | 8/2013 | Bruck | |
| 8,511,723 B2 | 8/2013 | Otsuka | |
| 8,590,973 B2 | 11/2013 | Matsuura et al. | |
| 8,608,245 B2 | 12/2013 | Wieclawski | |
| 8,672,385 B2 | 3/2014 | Matsumoto et al. | |
| 8,708,377 B2 | 4/2014 | Ishikawa et al. | |
| 8,840,187 B2 | 9/2014 | Seibold et al. | |
| 8,845,026 B2 | 9/2014 | Kobayashi et al. | |
| 8,864,224 B2 | 10/2014 | Kobayashi | |
| 8,926,019 B2 | 1/2015 | Lee et al. | |
| 8,950,810 B2 | 2/2015 | Dryburgh et al. | |
| 9,108,544 B2* | 8/2015 | Ogata | B60N 2/3013 |
| 2002/0033624 A1 | 3/2002 | Konishi et al. | |
| 2005/0067874 A1* | 3/2005 | Kamrath | B60N 2/4858 297/408 |
| 2005/0212338 A1 | 9/2005 | Muller et al. | |
| 2007/0057555 A1 | 3/2007 | Woods et al. | |
| 2007/0152484 A1 | 7/2007 | Palomba et al. | |
| 2009/0008981 A1 | 1/2009 | Wieclawski | |
| 2010/0060064 A1 | 3/2010 | Kienke et al. | |
| 2010/0109411 A1 | 5/2010 | Shinohara | |
| 2010/0141004 A1 | 6/2010 | Zeimis et al. | |
| 2011/0012416 A1 | 1/2011 | Sayama | |
| 2012/0133188 A1 | 5/2012 | Wieclawski et al. | |
| 2012/0193963 A1 | 8/2012 | Lutzka et al. | |
| 2013/0328372 A1 | 12/2013 | Suzumura et al. | |

FOREIGN PATENT DOCUMENTS

| | | |
|---|---|---|
| JP | 60-188032 U | 12/1985 |
| JP | 61-160752 U | 10/1986 |
| JP | 62-017447 U | 2/1987 |
| JP | 02-096221 U | 7/1990 |
| JP | 03-198811 A | 8/1991 |
| JP | 10-297332 A | 11/1998 |
| JP | 2009-292266 A | 12/2009 |
| JP | 2010-105655 A | 5/2010 |

OTHER PUBLICATIONS

Office Action issued for related application JP 2011-081071, with English translation, dated Mar. 31, 2015, 6 pages.

\* cited by examiner

CONVEYANCE SEAT

CROSS REFERENCE TO RELATED APPLICATIONS

This application is a divisional application of U.S. patent application Ser. No. 14/008,665, filed Nov. 19, 2013, which is the U.S. national phase of the International Patent Application No. PCT/JP2012/058419, filed Mar. 29, 2012, which claims the benefit of the following Japanese Patent Applications: Application No. 2011-081071, filed Mar. 31, 2011, Application No. 2011-081072, filed Mar. 31, 2011, and Application No. 2011-081073, filed Mar. 31, 2011, the entire content of all being incorporated herein by reference.

BACKGROUND

Disclosed herein is a conveyance seat including: a seat base on which an occupant sits; a support portion which supports the occupant from the back side; a flip-up mechanism which flips up the seat base; and a biasing member that biases the support portion so that the support portion is inclined forward, and particularly, a conveyance seat further including: an engagement portion which is engaged with the support portion to hold the support portion in a upright state against a biasing force of the biasing member and a cancel mechanism which cancels the engagement between the engagement portion and the support portion by using the flip-up operation of the flip-up mechanism.

There is known a conveyance seat including a seat base on which an occupant sits and a support portion which supports the occupant from the back side, where the conveyance seat is stowable in a folded state. In the conveyance seat, a conveyance seat exists which includes a biasing member that biases a predetermined portion of a seat while folding the seat (for example, see Japanese Patent Document No. 2009-292266 A ("the '266 Document")).

As an example of the biasing member, a biasing member is considered which biases the support portion so that the support portion is inclined forward. In a case where the conveyance seat with such a biasing member further includes, for example, a flip-up mechanism which flips up the seat base and an engagement portion which is engaged with the support portion to hold the support portion in an upright state against the biasing force of the biasing member, when the engagement between the engagement portion and the support portion is canceled, the support portion is inclined forward by the biasing force of the biasing member.

Furthermore, a case is considered in which the canceling of the engagement between the engagement portion and the support portion is performed while being interlocked with the flip-up operation of the seat base using the flip-up mechanism. In other words, when the engagement between the engagement portion and the support portion is canceled by using the flip-up operation, the biasing force generated by the biasing member is exerted on the support portion.

Further, the conveyance seat disclosed in the '266 Document includes a seat body which includes a seat cushion and a seatback, a biasing mechanism which biases the seat body toward a stowed position, a cancel mechanism which prevents the biasing force of the biasing mechanism from being applied to the seat body, and a relay mechanism which transmits a seat body folding operation to the cancel mechanism. The relay mechanism includes a moving link and a following link as components, and is configured to transmit the seat body folding operation to the cancel mechanism.

Further, as the conveyance seat, there is known a conveyance seat including a seat back frame, a headrest, a pillar supporting the headrest, and a headrest rotation mechanism rotatably supporting the pillar. The headrest rotation mechanism has a function of rotating the pillar forward so that the headrest is inclined forward. Furthermore, in the headrest rotation mechanism with such a function, a headrest rotation mechanism also exists which is operated by remote control other than a headrest rotation mechanism which is operated by a direct operation of an occupant (for example, see Japanese The '655 Document 010-105655 A ("the '655 Document").

In the above-described stowable conveyance seat, after the engagement between the engagement portion and the support portion is canceled, there is a need to maintain the engagement canceled state so that the support portion is smoothly inclined forward by the biasing force of the biasing member. For example, when the engagement between the engagement portion and the support portion is canceled by mistake, it is desirable to return the erroneous state to the state where the engagement portion and the support portion may be engaged with each other again. That is, from the viewpoint of the improvement of the operability of the conveyance seat, in a case where the conveyance seat is stowed, there is a need to return the current state to the state where the engagement portion and the support portion may be engaged with each other again even when the support portion is being inclined forward after the engagement between the engagement portion and the support portion is canceled so that the support portion is inclined forward.

A case is considered in which a conveyance seat including a seat base that is flipped up to a stowed position, a support portion that is inclinable forward, a first operation mechanism that serves as a flip-up mechanism for performing a first operation of flipping up the seat base, and a second operation mechanism that performs a second operation of inclining the support portion forward further includes a drive mechanism that is configured to cause the second operation mechanism to perform the second operation using the first operation of the first operation mechanism. The drive mechanism corresponds to the relay mechanism disclosed in the '266 Document, and the respective components of the drive mechanism are operated to move the first operation of the first operation mechanism in a manner of being interlocked with the second operation of the second operation mechanism.

In the conveyance seat with the above-described configuration, there is a need to attach the drive mechanism to the appropriate attachment position so that the respective components of the drive mechanism are stably operated in the interlocking movement between the first operation of the first operation mechanism and the second operation of the second operation mechanism.

Further, there is a need to ensure the installation space inside the seat for the above-described headrest rotation mechanism, but it is desirable to provide the installation space around the headrest from the viewpoint of the operability. A conveyance seat is demanded with a decreased size as a whole while ensuring the installation space for the headrest rotation mechanism.

Therefore, conveyance seat is described herein in view of the above-described problems, and it is an object of various embodiments of the present invention to provide a conveyance seat with excellent operability in a manner such that an engagement between an engagement portion and a support portion is appropriately canceled and the engagement portion and the support portion may appropriately be engaged with each other again.

Further, it is another object to attach a drive mechanism to an appropriate attachment position inside the conveyance seat to stabilize the operations of the respective components of the drive mechanism.

Furthermore, it is still another object to decrease the size of the conveyance seat with a headrest rotation mechanism rotatably supporting a pillar.

According to a conveyance seat according to various embodiments of the present invention, the above-described problem is solved by a conveyance seat including: a seat base on which an occupant sits; a support portion which supports the occupant from the back side; a flip-up mechanism which flips up the seat base; a biasing member which biases the support portion forward so that the support portion is inclined forward; an engagement portion which is engaged with the support portion to hold the support portion in a upright state against the biasing force of the biasing member; a cancel mechanism which cancels the engagement between the engagement portion and the support portion by using the flip-up operation using the flip-up mechanism; and a return mechanism which performs a return operation of returning the support portion from a state where the engagement with the engagement portion is canceled by the cancel mechanism to a state where the support portion is engageable with the engagement portion, in which the return mechanism performs the return operation in accordance with the inclination angle of the support portion inclined forward by the biasing force of the biasing member after the engagement between the engagement portion and the support portion is canceled.

According to such a configuration, at the time point when the inclination angle of the support portion inclined forward reaches, for example, a predetermined angle after the engagement between the engagement portion and the support portion is canceled, the engagement portion and the support portion may be engaged with each other again. As a result, even when the engagement between the engagement portion and the support portion is canceled by mistake so that the support portion is inclined forward, the current state may be returned to the state where the engagement portion and the support portion are engaged with each other again, and hence the conveyance seat with excellent operability is provided.

Further, in the above-described conveyance seat, the engagement between the engagement portion and the support portion may be canceled after the flip-up operation starts, and the return mechanism may perform the return operation at a time when the inclination angle reaches a predetermined set angle after the support portion starts to be inclined forward by the biasing force of the biasing member by canceling the engagement between the engagement portion and the support portion.

According to such a configuration, since there is a time difference between the time point of canceling the engagement between the engagement portion and the support portion and the time point of performing the return operation, the return operation is performed, for example, immediately after the engagement between the engagement portion and the support portion is canceled. Accordingly, it is possible to prevent a problem in which the engagement between the engagement portion and the support portion is not appropriately canceled.

Further, in the above-described conveyance seat, the cancel mechanism may include a first rotation member that rotates by using the flip-up operation, a second rotation member that rotates to cancel the engagement between the engagement portion and the support portion, and an engagement pin which is engaged with the second rotation member. When the second rotation member rotates from one end position toward the other end position of the rotation range thereof, the engagement between the engagement portion and the support portion may be canceled, and when the second rotation member returns to the one end position of the rotation range, the engagement portion and the support portion may be engaged with each other again. Further, the return mechanism may include a biasing spring which biases the second rotation member so that the second rotation member is directed toward the one end position of the rotation range, and when the first rotation member rotates while the second rotation member is engaged with the engagement pin, the engagement pin may rotate the second rotation member from the one end position toward the other end position of the rotation range against the biasing force of the biasing spring by using the rotation of the first rotation member. Furthermore, the return mechanism may perform a return operation of returning the position of the second rotation member to the one end position of the rotation range by the biasing force of the biasing spring by canceling the engagement state between the second rotation member and the engagement pin at a time when the inclination angle of the support portion reaches the set angle.

According to such a configuration, it is possible to appropriately select the state where the engagement between the engagement portion and the support portion is canceled or the state where the engagement portion and the support portion may be engaged with each other again by controlling the position of the rotation body. Further, since the position of the second rotation member may be controlled by adjusting the mechanical configuration as the engagement state between the second rotation member and the engagement pin, it is possible to select the state where the engagement between the engagement portion and the support portion is canceled or the state where the engagement portion and the support portion may be engaged with each other again by a comparatively simple configuration.

Further, in the above-described conveyance seat, the second rotation member may be provided with a guide hole through which the engagement pin passes, a portion located at the peripheral edge of the guide hole in the second rotation member may be provided with a convex portion which protrudes toward the inside of the guide hole, and the engagement pin may be engaged with the convex portion to be engaged with the second rotation member and move inside the guide hole to climb over the convex portion so that the engagement state with the second rotation member is canceled. Further, the return mechanism may include a pulling member that pulls the engagement pin so that the engagement pin climbs over the convex portion by the forward inclining operation of the support portion, and the pulling member may pull the engagement pin so that the engagement pin climbs over the convex portion at a time when the inclination angle of the support portion reaches the set angle.

According to such a configuration, it is possible to switch the engagement state between the second rotation member and the engagement pin by a comparatively simple configuration. Further, it is possible to adjust the time point when the engagement pin climbs over the convex portion (that is, the time point when the engagement portion and the support portion may be engaged with each other again) by adjusting the shape of the convex portion.

Further, the above-described conveyance seat may further include a cushioning rubber member that collides with the second rotation member when the position of the second rotation member returns to the one end position of the rotation range by the biasing force of the biasing spring.

According to such a configuration, it is possible to reduce an impact involved with the second rotation member when the second rotation member returns to one end position of the rotation range.

Further, the above-described conveyance seat may further include a rotation shaft which supports the first rotation member and the second rotation member in a rotatable manner; and a casing to which the rotation shaft is attached and which covers the first rotation member and the second rotation member, in which the casing may include a slit formed in the rotation direction of the first rotation member, and the first rotation member may include a protrusion which moves inside the slit in the rotation direction when the first rotation member rotates.

According to such a configuration, since the protrusion of the first rotation member moves along the slit formed in the casing when the first rotation member rotates, the first rotation member may appropriately rotate within the set rotation range.

Further, in the above-described conveyance seat, the seat base may be a seat cushion which flips up toward a stowed position, the support portion may be a seatback which includes therein a seat back frame and is inclinable forward, and the flip-up mechanism may be a first operation mechanism which performs a first operation of flipping up the seat cushion. The conveyance seat may further include: a second operation mechanism which includes the biasing member and performs a second operation of inclining the seatback forward by the biasing force of the biasing member; and a drive mechanism which causes the second operation mechanism to perform the second operation by using the first operation of the first operation mechanism. Further, the seat back frame may include a plate-shaped pan frame and a reinforcing plate attached to a front surface of the pan frame in an overlapping state, and the drive mechanism may be attached to a portion in which the pan frame overlaps the reinforcing plate in the front surface of the pan frame.

According to such a configuration, the operations of the respective components of the drive mechanism are stabilized by attaching the drive mechanism to the highly rigid portion in the pan frame.

Further, in the above-described conveyance seat, the seat back frame may include the pan frame, the reinforcing plate, and a pipe frame attached along the outer edge of the pan frame, the reinforcing plate may be long in the width direction of the seat back frame, and one longitudinal end of the reinforcing plate may be overlapped to the pipe frame to be fixed to the pipe frame.

According to such a configuration, it is possible to improve the reinforcement effect using the reinforcing plate and hence to further improve the rigidity of the attachment position of the drive mechanism.

Further, in the above-described conveyance seat, the drive mechanism may be attached to a center portion of the front surface of the pan frame in the height direction of the seat back frame intersecting with the width direction.

According to such a configuration, it is possible to further stabilize the operations of the respective components of the drive mechanism.

Further, the above-described conveyance seat may further include a linear member that is connected to the drive mechanism and moves when the seatback is inclined forward, in which the linear member may be wired to one end of the pan frame in the width direction, in which a space, which accommodates a part of the linear member when the linear member moves, may be provided between the one end of the pan frame and the pipe frame located at the front side of the one end of the pan frame, in which in the one end of the pan frame provided with the space, a portion located at the outer edge of the pan frame may be provided with a wall which regulates the linear member accommodated in the space from protruding toward the outside of the pan frame, and in which the one end of the pan frame provided with the space may be close to the attachment position of the drive mechanism compared to the other end of the pan frame.

According to such a configuration, the flapping of the linear member caused by the forward inclining operation of the seatback may be moderated inside the space. Further, it is possible to appropriately wire the linear member by regulating the linear member received inside the space from protruding toward the outside of the pan frame. Further, since the linear member is wired to one end of the pan frame close to the attachment position of the drive mechanism, the one end side is provided with a space for receiving the linear member, and hence the effect by the space may be effectively exhibited.

Further, the above-described conveyance seat may further include: a headrest which is provided above the seat back frame and is inclinable forward; and a third operation mechanism which performs a third operation of inclining the headrest forward, in which the drive mechanism may operate to cause the second operation mechanism to perform the second operation by using the first operation and to cause the third operation mechanism to perform the third operation, in which the third operation mechanism may be attached to the pan frame while being located above the drive mechanism in the height direction of the seat back frame intersecting with the width direction, and in which an upper end of the reinforcing plate may be located above an upper end of the drive mechanism in the height direction and an upper end of the third operation mechanism may be located above the upper end of the reinforcing plate.

According to such a configuration, since the drive mechanism and the third operation mechanism are attached to the pan frame while being disposed in parallel in the height direction of the seat back frame, the rigidity of the pan frame is further improved. Further, since the reinforcing plate is laid between the drive mechanism and the third operation mechanism in the height direction of the seat back frame, the rigidity of the pan frame is further improved.

Further, in the above-described conveyance seat, the third operation mechanism may be a headrest rotation mechanism which supports a pillar supporting the headrest in a rotatable manner. The headrest rotation mechanism may perform a third operation of rotating the pillar so that the headrest at a use position is located at an inclining position where the headrest is inclined forward. Further, an upper portion of the seat back frame may be provided with a regulation portion which regulates a rearward rotation of the pillar when the headrest is located at the use position, and the headrest rotation mechanism may be fixed to the regulation portion.

According to such a configuration, since the headrest rotation mechanism is fixed by effectively using the space provided with the regulation portion, the size of the conveyance seat may be decreased.

Further, in the above-described conveyance seat, the headrest rotation mechanism may include an elongated plate-shaped headrest rotation mechanism side casing in the width direction of the seat back frame, and the headrest rotation mechanism side casing may be attached to the front surface by a stud bolt protruding from a front surface of the regulation portion so that the headrest rotation mechanism side casing is fixed to the regulation portion.

According to such a configuration, since the headrest rotation mechanism may be attached from the front side of the seat back frame, the headrest rotation mechanism may be easily attached, and hence the assembling workability is improved.

Further, in the above-described conveyance seat, the regulation portion may be located inside in the width direction compared to both ends of the headrest rotation mechanism side casing.

According to such a configuration, since the region provided to dispose the pillar therein in the width direction of the seat back frame is effectively used to set the stud bolt, there is no need to separately ensure a space for setting the stud bolt, and hence the size of the conveyance seat may be further decreased.

Further, in the above-described conveyance seat, the pillar may include a vertical portion which extends in the up and down direction of the seat back frame and a horizontal portion which is adjacent to a lower end of the vertical portion and extends in the width direction. Further, a center portion of the front surface may be located and the stud bolt is disposed at the position of the vertical portion in the width direction. Furthermore, a lower end of the front surface may be located and the stud bolt may be disposed below the horizontal portion in the up and down direction.

According to such a configuration, since an empty space is formed below the joint position between the vertical portion and the horizontal portion and the empty space is used to install the stud bolt, there is no need to separately ensure the space for setting the stud bolt, and hence the size of the conveyance seat may be further decreased.

Further, in the above-described conveyance seat, the drive mechanism may be attached to the front surface of the pan frame by the stud bolt protruding from the front surface of the pan frame.

According to such a configuration, since the drive mechanism may be attached from the front side of the pan frame, the drive mechanism may be easily attached.

According to an embodiment of the conveyance seat, even when the engagement between the engagement portion and the support portion is canceled by mistake so that the support portion is inclined forward, the current state may be returned to the state where the engagement portion and the support portion are engaged with each other again, and hence the conveyance seat with excellent operability is provided.

According to an embodiment of the conveyance seat, since the return operation is performed immediately after the engagement between the engagement portion and the support portion is canceled, it is possible to prevent a problem in which the engagement between the engagement portion and the support portion is not appropriately canceled.

According to an embodiment of the conveyance seat, it is possible to appropriately select the state where the engagement between the engagement portion and the support portion is canceled or the state where the engagement portion and the support portion may be engaged with each other again by the rotation operation of the rotation body. Further, since the rotation operation of the second rotation member may be controlled by a comparatively simple configuration, it is possible to select the state where the engagement between the engagement portion and the support portion is canceled or the state where the engagement portion and the support portion may be engaged with each other again.

According to an embodiment of the conveyance seat, it is possible to switch the engagement state between the second rotation member and the engagement pin by a comparatively simple configuration. Further, it is possible to adjust the time point when the engagement pin climbs over the convex portion (that is, the time point when the engagement portion and the support portion may be engaged with each other again) by adjusting the shape of the convex portion.

According to an embodiment of the conveyance seat, it is possible to reduce an impact involved with the second rotation member when the second rotation member returns to one end position of the rotation range.

According to an embodiment of the conveyance seat, the first rotation member may appropriately rotate within the set rotation range.

According to an embodiment of the conveyance seat, the operations of the respective components of the drive mechanism are stabilized by attaching the drive mechanism to the highly rigid portion in the pan frame.

According to an embodiment of the conveyance seat, it is possible to improve the reinforcement effect using the reinforcing plate and hence to further improve the rigidity of the attachment position of the drive mechanism.

According to an embodiment of the conveyance seat, it is possible to further stabilize the operations of the respective components of the drive mechanism.

According to an embodiment of the conveyance seat, the flapping of the linear member caused by the forward inclining operation of the seatback may be moderated inside the space. Further, it is possible to appropriately wire the linear member by regulating the linear member received inside the space from protruding toward the outside of the pan frame. Further, since the linear member is wired to one end of the pan frame close to the attachment position of the drive mechanism, the one end side is provided with a space for receiving the linear member, and hence the effect by the space may be effectively exhibited.

According to an embodiment of the conveyance seat, since the drive mechanism and the third operation mechanism are attached to the pan frame while being disposed in parallel in the height direction of the seat back frame, the rigidity of the pan frame is further improved. Further, since the reinforcing plate is laid between the drive mechanism and the third operation mechanism in the height direction of the seat back frame, the rigidity of the pan frame is further improved.

According to an embodiment of the conveyance seat, since the headrest rotation mechanism is fixed by effectively using the space provided with the regulation portion, the size of the conveyance seat may be decreased.

According to an embodiment of the conveyance seat, since the headrest rotation mechanism may be attached from the front side of the seat back frame, the headrest rotation mechanism may be easily attached, and hence the assembling workability is improved.

According to an embodiment of the conveyance seat, since the region provided to dispose the pillar therein in the width direction of the seat back frame is effectively used to set the stud bolt, there is no need to separately ensure a space for setting the stud bolt, and hence the size of the conveyance seat may be further decreased.

According to an embodiment of the conveyance seat, since an empty space is formed below the joint position between the vertical portion and the horizontal portion and the empty space is used to install the stud bolt, there is no need to separately ensure the space for setting the stud bolt, and hence the size of the conveyance seat may be further decreased.

According to an embodiment of the conveyance seat, since the drive mechanism may be attached from the front side of the pan frame, attachment of the drive mechanism is facilitated.

BRIEF DESCRIPTION OF THE DRAWINGS

The following drawing figures illustrate various embodiments of the invention:

FIG. 16 is a perspective diagram illustrating a wiring space AS.

DETAILED DESCRIPTION

Hereinafter, an embodiment (hereinafter, this embodiment) according to the present invention will be described by referring to FIGS. 1 to 16.

Figure 7:
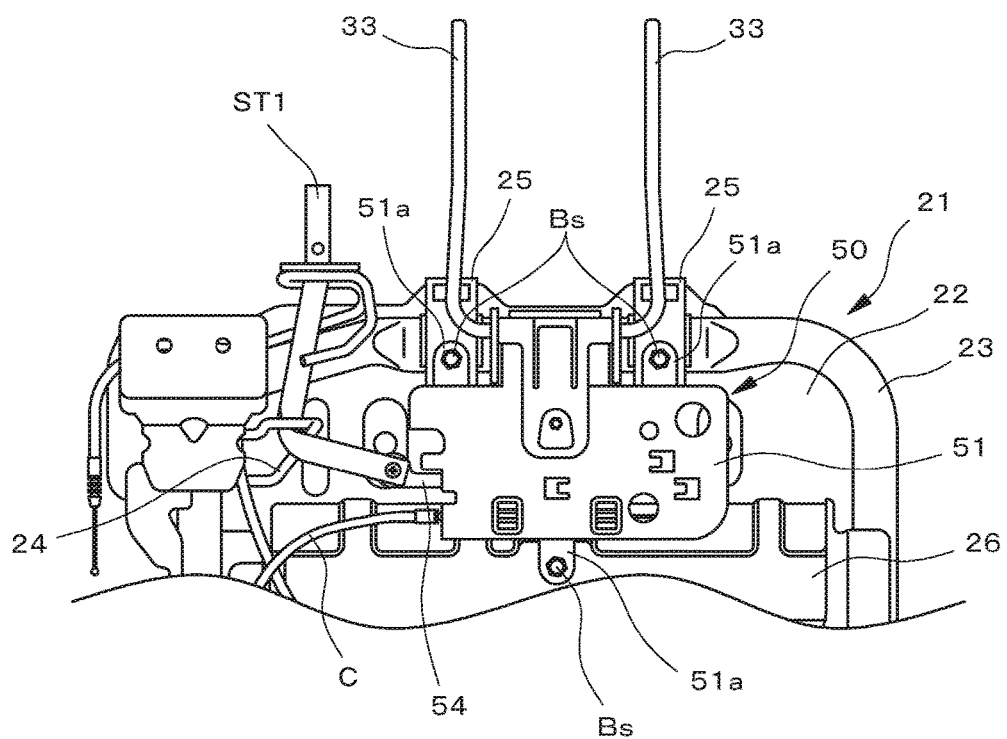
FIG. 7 is a front view diagram illustrating a headrest rotation mechanism 50.
Figure 8:
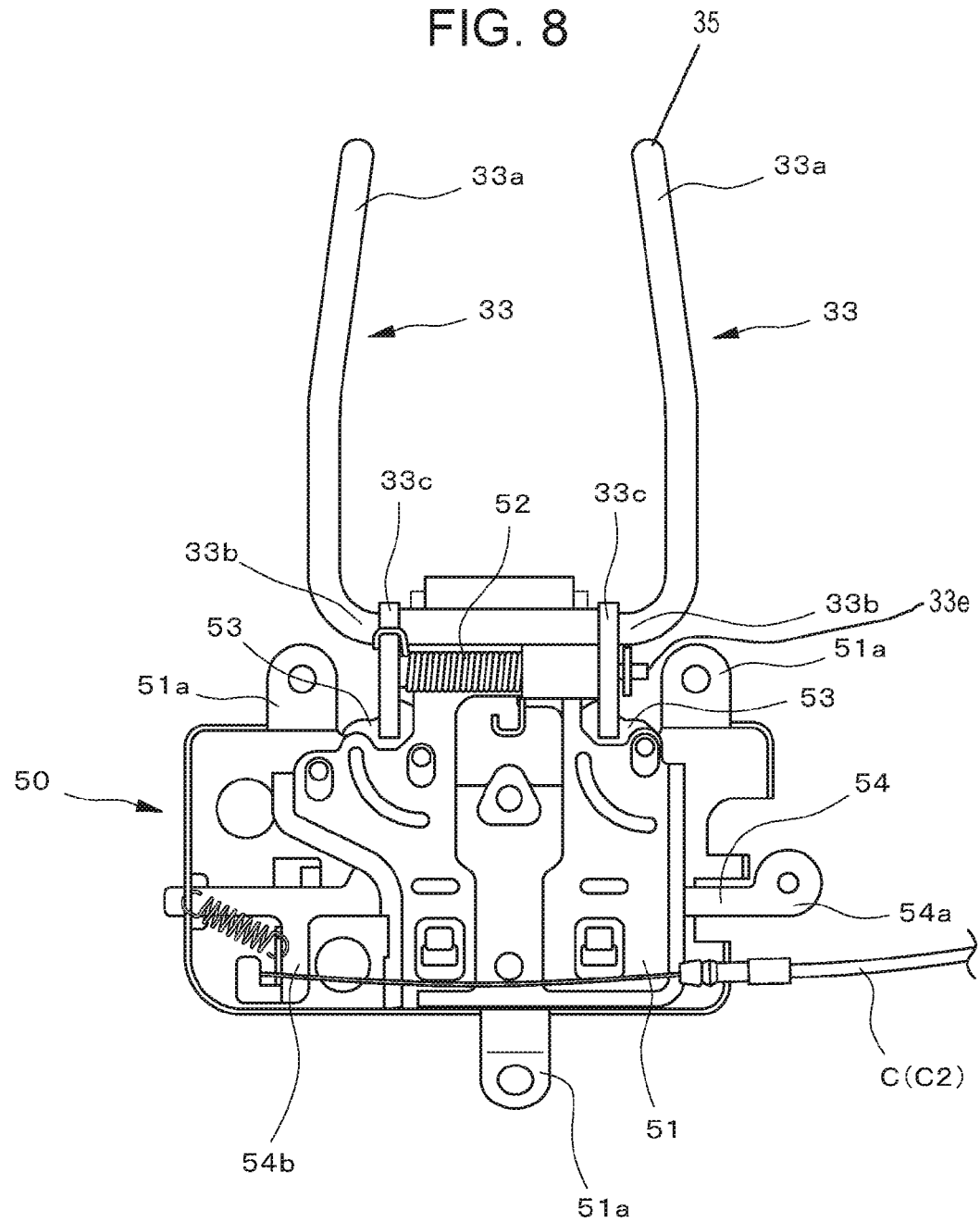
FIG. 8 is a rear view diagram illustrating the headrest rotation mechanism 50.
Figure 9:
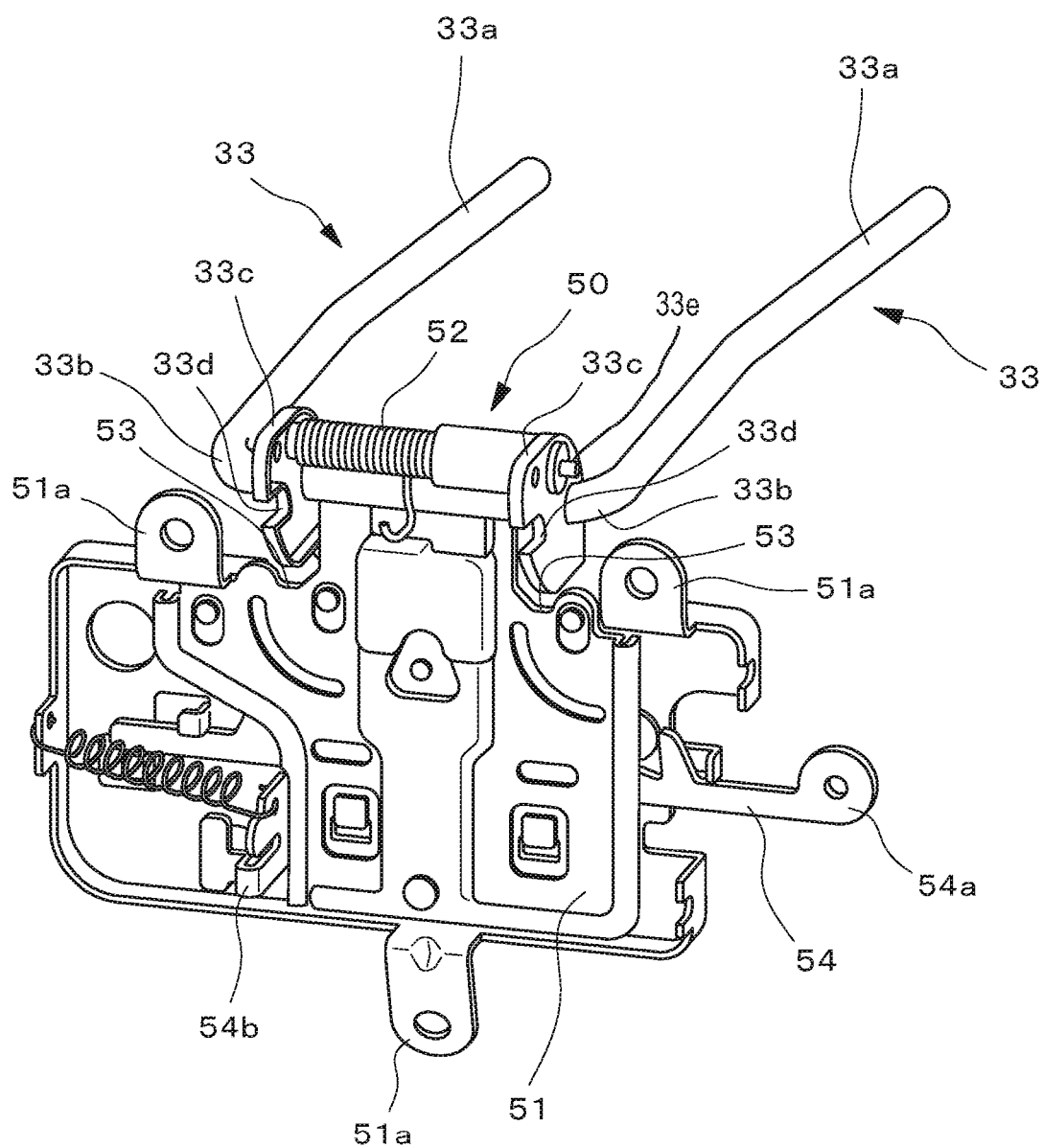
FIG. 9 is a rear perspective view of the headrest rotation mechanism 50.
Figure 14:
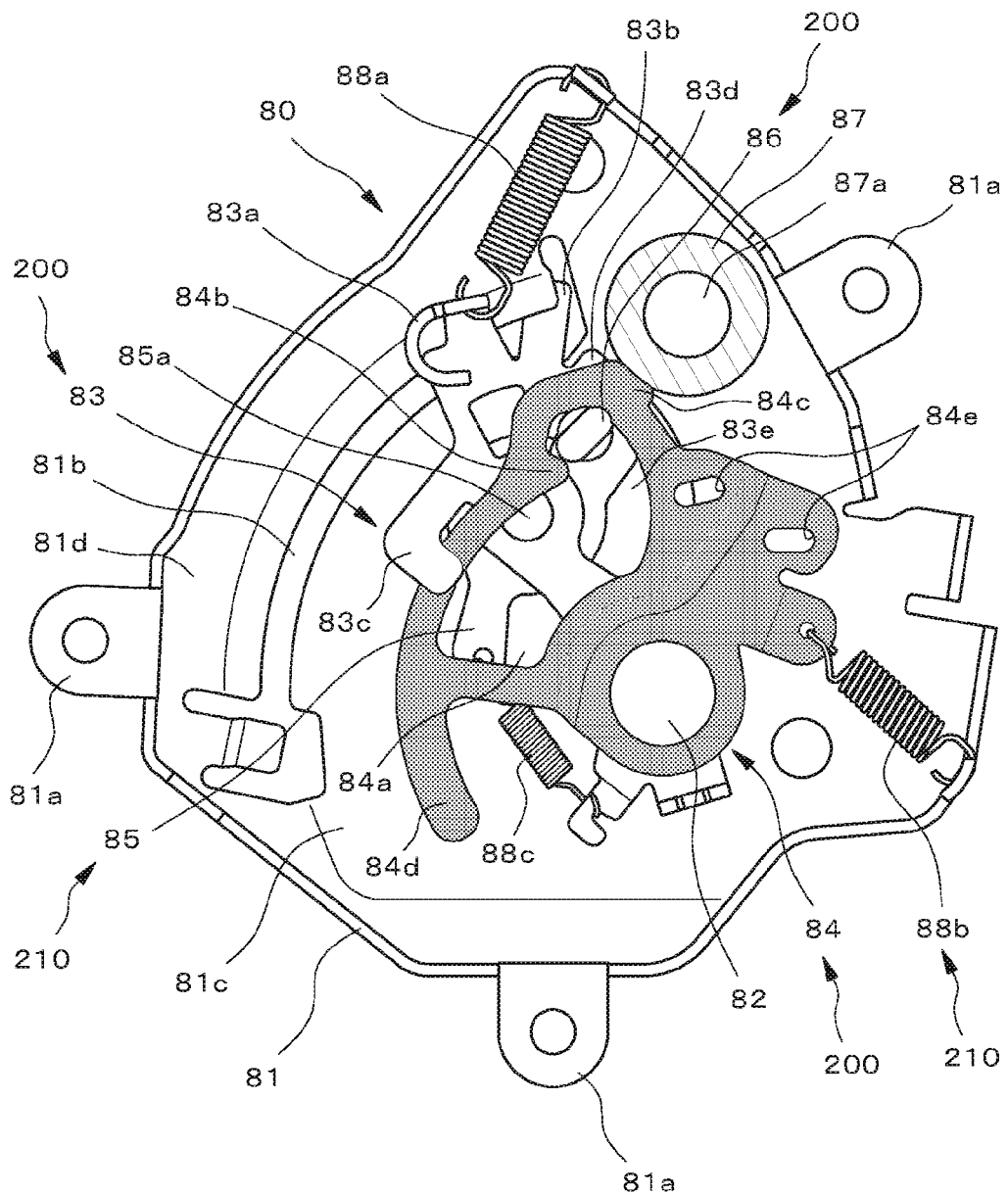
FIG. 14 is a rear view diagram illustrating an arrangement unit 80.
Figure 15A:
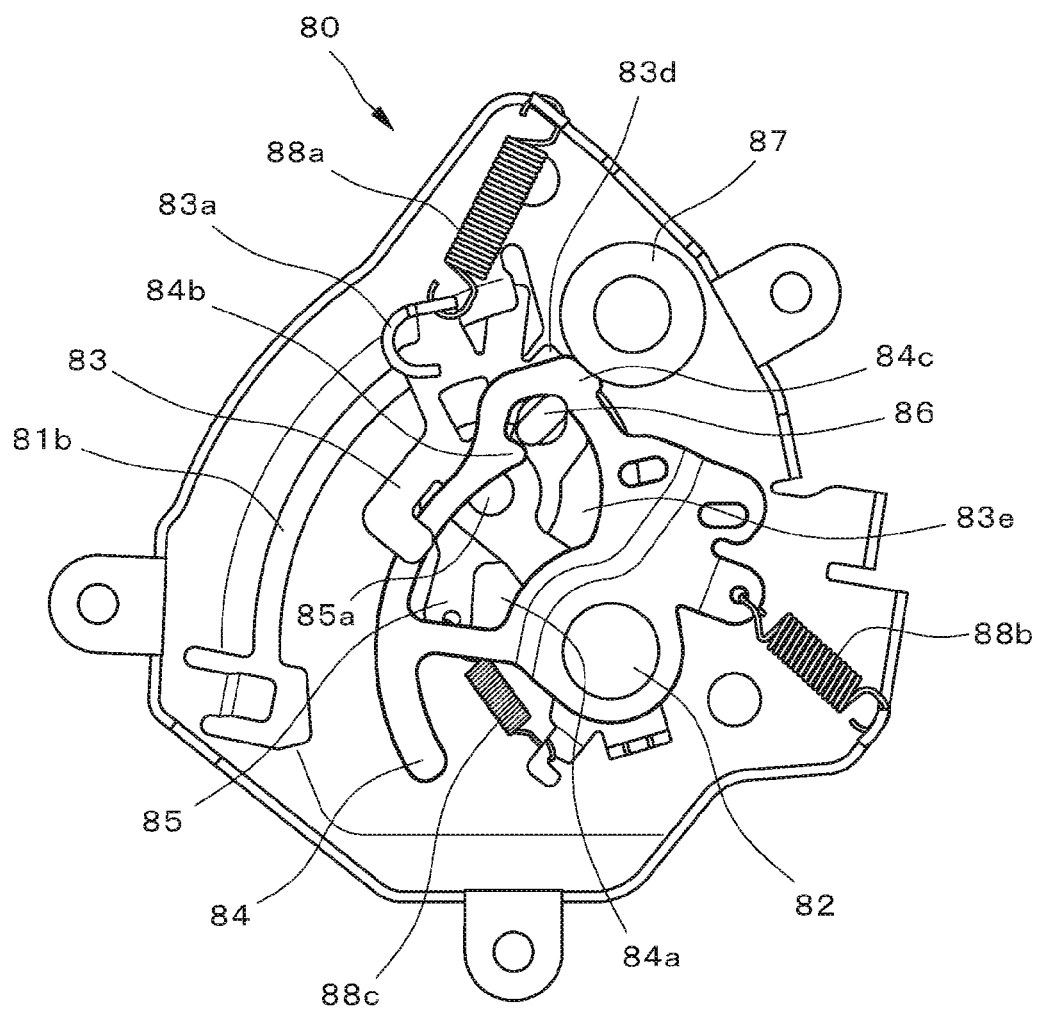
FIG. 15A is a (first) rear view diagram illustrating an operation example of the arrangement unit 80.

FIGS. 1 to 16 illustrate a vehicle seat (hereinafter, a vehicle seat S1) according to this embodiment. FIGS. 7 to 9 are diagrams illustrating a headrest rotation mechanism 50. FIGS. 15A to 15D are diagrams illustrating operation examples of the arrangement unit 80. FIG. 16 is a diagram illustrating a wiring space AS.

Furthermore, the sign FR of the drawings indicates the front side of the vehicle, the sign RR indicates the rear side of the vehicle, and the sign UP indicates the upper side of the vehicle. Further, in the description below, the right and left direction indicates the right and left direction while the vehicle faces the front side, and matches the width direction of the seat back frame 21 to be described later. Further, the height direction of the seat back frame 21 indicates a direction which intersects with the width direction of the seat back frame 21, and indicates a direction which changes by the operation of inclining the seatback 20 toward the front side.

Figure 1:
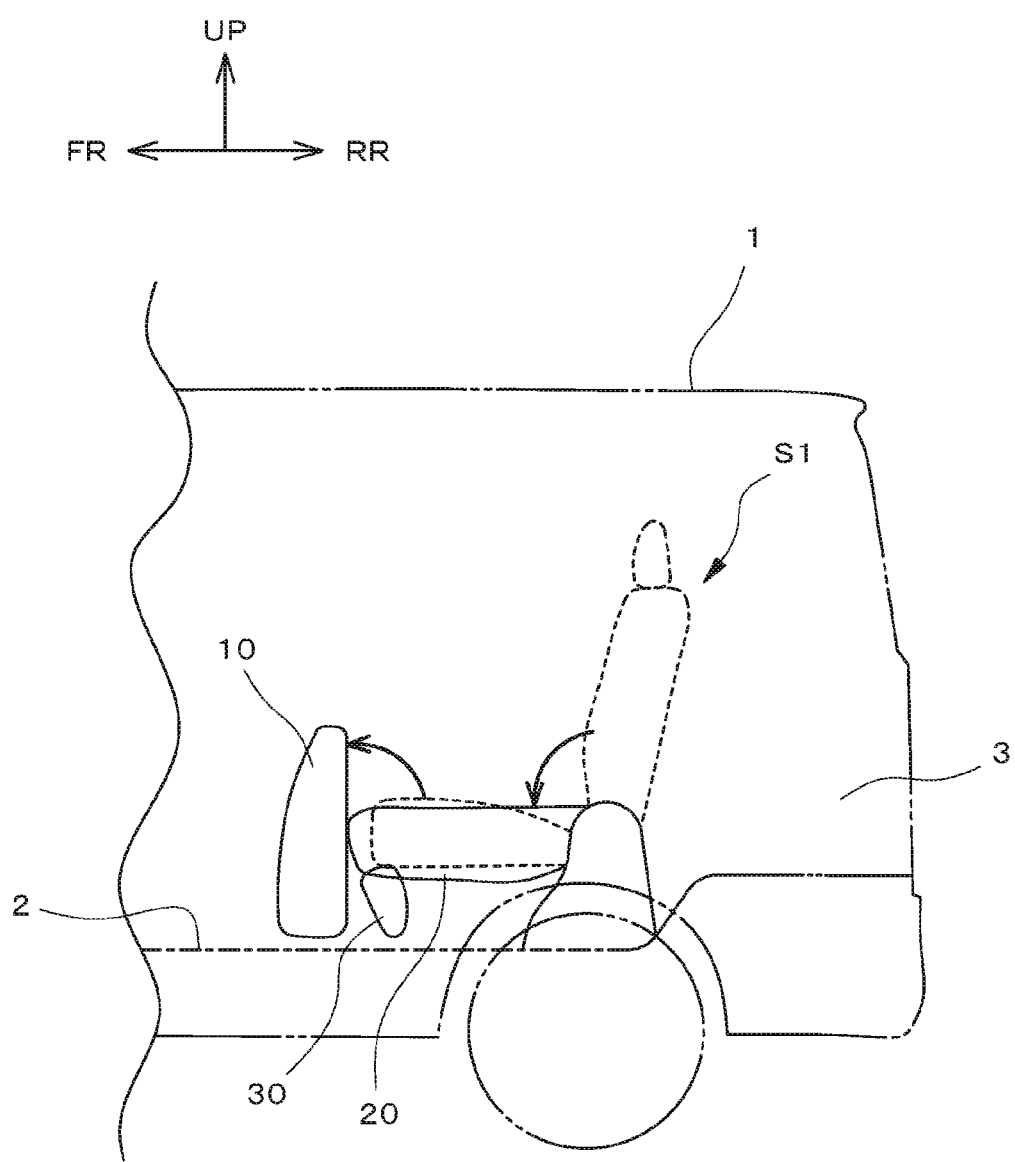
FIG. 1 is a schematic side view of a vehicle rear part equipped with a vehicle seat S1.

As illustrated in FIG. 1, the vehicle seat S1 is an example of a conveyance seat, and is mounted as a rear seat on the vehicle 1 which has a luggage compartment space at a rear part of a vehicle body of an automobile. Particularly, in this embodiment, the vehicle seat is mounted on a wagon type automobile.

Regarding the configuration of the vehicle seat S1, in this embodiment, the vehicle seat is divided into a right (passenger side) vehicle seat S11 and a left (driver side) vehicle seat S12, and each of the vehicle seats S11 and S12 includes a seat cushion 10 that serves as a seat base on which an occupant sits, a seatback 20 that serves as a support portion for supporting the occupant from the back side, and a headrest 30 that supports the head of the occupant. Furthermore, an armrest 40 is disposed between the seatbacks 20 of the respective vehicle seats S11 and S12. In the left vehicle seat S12, the seatback 20 is integrated with a pedestal portion 20a located below the armrest 40 in FIG. 2, and the seat cushion 10 is integrated with a projection portion 10a disposed at the lower position of the pedestal portion 20a in FIG. 2.

The right vehicle seat S11 and the left vehicle seat S12 are different from each other in the above-described points, but both vehicle seats S11 and S12 have the same basic configurations. For this reason, in the description below, only the configuration of the right vehicle seat S11 will be described.

The vehicle seat S1 may switch its posture from a normal (or sitting) posture (which is a posture indicated by the dashed line in FIG. 1) in which an occupant may sit on the vehicle seat to a (stowed) posture (which is a posture indicated by the solid line in FIG. 1) in which the seat is stowed to form a luggage compartment part 3 in a non-use state. Specifically, the seat cushion 10 flips up toward the vehicle front side when changing the posture of the vehicle seat S1 to the stowed posture. Further, the seat cushion 10 flips up and the seatback 20 rotates forward to be inclined to a position where the seat cushion 10 that is not flipped up is disposed on the vehicle body floor 2. Further, when the headrest 30 rotates forward by about 90° from a state where the headrest is disposed above the seatback 20 in the substantially vertical direction so that the seatback 20 is inclined onto the vehicle body floor 2, the headrest is stowed between the seat cushion 10 that is flipped up forward and the inclined seatback 20.

Because of the above-described series of operations (hereinafter, referred to as stowing operations), the vehicle seat S1 is stowed in a compact posture. Then, in the vehicle 1 which employs the vehicle seat S1 with the above-described configuration as the rear seat, the luggage compartment part 3 which constitutes a part of the vehicle body floor 2 is formed at the rear side of the vehicle seat S1, and the luggage compartment part 3 is widened to the usable size obtained by the stowing operation of the vehicle seat S1.

As described above, the vehicle seat S1 is configured to switch its posture between the sitting posture and the stowed posture. Further, in this embodiment, the posture may be switched so that only the headrest 30 is independently inclined forward from the sitting posture or the posture may be switched so that only the seatback 20 is independently raised from the stowed posture. These various kinds of seat arrangements are realized by various driving mechanisms (specifically, a headrest rotation mechanism 50, a seat cushion flipping-up mechanism 60, a seatback inclining mechanism 70, and the like to be described later) provided in the vehicle seat S1. Hereinafter, a configuration for realizing the seat arrangements of the vehicle seat S1 will be described.

Furthermore, in the description below, the sitting positions of the seat cushion 10, the seatback 20, and the headrest 30 indicate the positions of the seat cushion 10, the seatback 20, and the headrest 30 when the posture of the vehicle seat S1 is held in the sitting posture, and correspond to the respective use positions. Further, the flip-up position of the seat cushion 10 indicates the position of the seat cushion 10 when the posture of the vehicle seat S1 is held in the stowed posture, and corresponds to a stowed position. The inclining positions of the seatback 20 and the headrest 30 respectively indicate the positions of the seatback 20 and the headrest 30 when the posture of the vehicle seat S1 is held in the stowed posture.

Basic Configuration of the Vehicle Seat S1

In order to describe the configuration for realizing the seat arrangements of the vehicle seat S1, the basic configuration of the vehicle seat S1 will be described. As described above, the vehicle seat S1 includes the seat cushion 10, the seatback 20, and the headrest 30.

Figure 3:
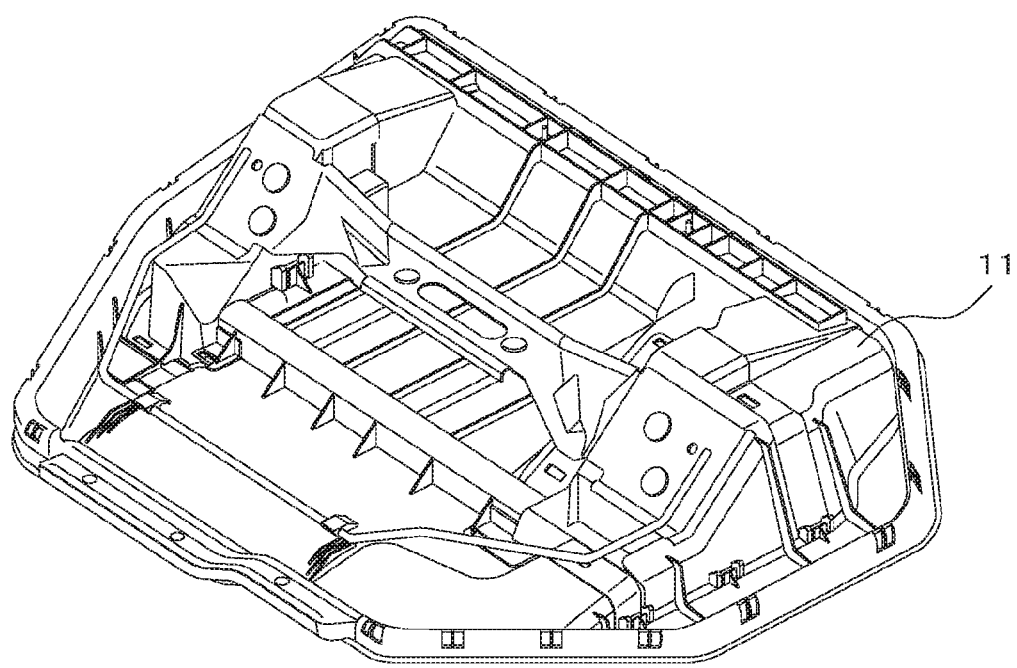
FIG. 3 is a front perspective view of a cushion frame 11.

The seat cushion 10 is formed by attaching a surface material to a cushion frame 11 illustrated in FIG. 3. The attachment of the surface material is obtained by locking a trim cord (not illustrated) sewn to the end of the surface material to the outer edge of the cushion frame 11.

Figure 4:
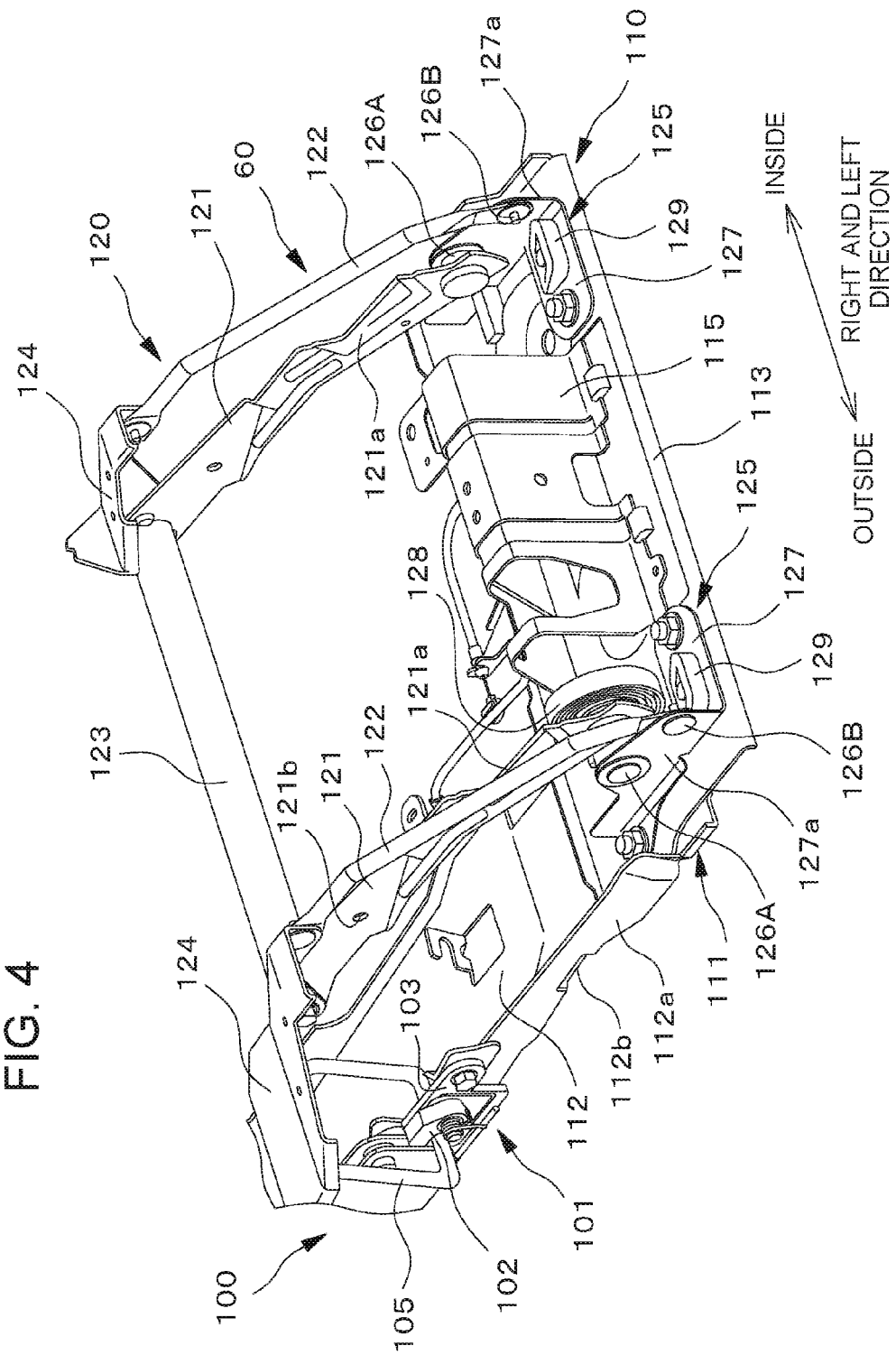
FIG. 4 is a front perspective view (first diagram) of a seat cushion flipping-up mechanism 60.

Further, the seat cushion flipping-up mechanism 60 illustrated in FIG. 4 is disposed at the lower portion of the seat cushion 10. The seat cushion flipping-up mechanism 60 is fixed onto the vehicle body floor 2. Then, the seat cushion flipping-up mechanism supports the seat cushion 10, and flips up the seat cushion 10 from the sitting position toward the flip-up position when stowing the vehicle seat S1.

That is, the seat cushion 10 is fixed to the sitting position on the vehicle body floor 2 through the seat cushion flipping-up mechanism 60, and flips up from the sitting position toward the flip-up position when the seat cushion flipping-up mechanism 60 is operated. In other words, the seat cushion 10 may move in a reciprocating manner between the sitting position and the flip-up position.

Furthermore, the seat cushion flipping-up mechanism 60 includes a striker lock mechanism 100. The striker lock mechanism 100 fixes the seat cushion 10 to the sitting position when the posture of the vehicle seat S1 is maintained in the sitting posture. The seat cushion flipping-up mechanism 60 and the striker lock mechanism 100 will be described in detail later.

Figure 5:
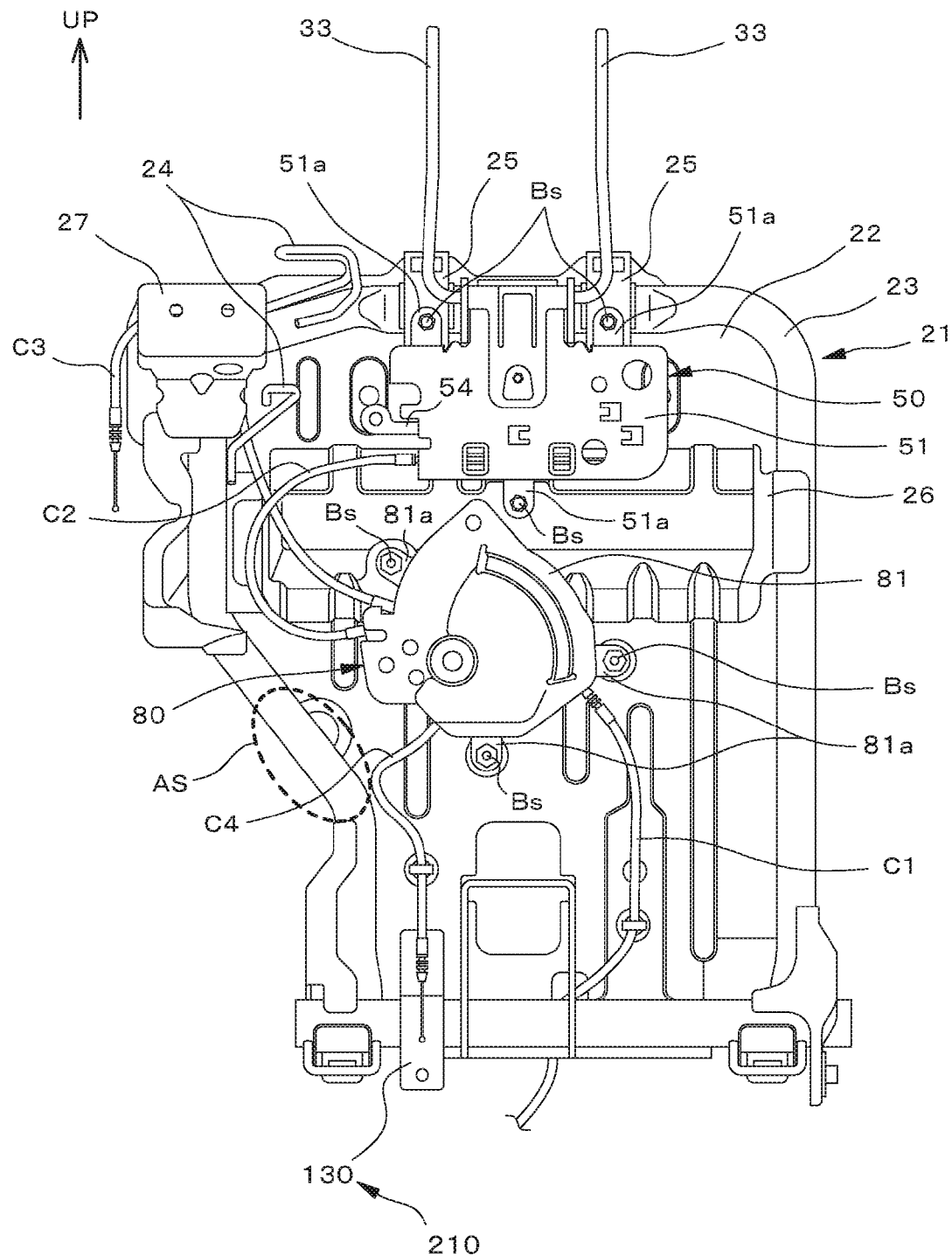
FIG. 5 is a front view diagram illustrating a seatback frame 21.

The seatback 20 is formed by piling urethane as a cushion material on the seat back frame 21 illustrated in FIG. 5 and covering the seat back frame by a surface material. In other words, the seatback 20 includes therein the seat back frame 21. The seatback frame 21 of the seatback 20 includes a plate-shaped pan frame 22 which forms the base portion of the seatback frame 21 and a pipe frame 23 which forms the outer frame of the seatback frame 21. The pan frame 22 is molded by performing a process such as beading for ensuring rigidity on a substantially rectangular metal sheet. Then, the headrest rotation mechanism 50 or the arrangement unit 80 to be described later is attached to the front surface of the pan frame 22.

The pipe frame 23 is located at the front side of the pan frame 22, is disposed along the outer edge of the pan frame 22 to surround the pan frame 22, and is bonded to the pan frame 22 by welding. Furthermore, in the pipe frame 23, a position located at the lower portion of the seatback 20 in the up and down direction and a position facing the outside of the vehicle 1 in the right and left direction are disposed to form a gap with respect to the pan frame 22 in the thickness direction of the seatback 20. The reason why such a gap is formed is because, for example, the end of the urethane as the cushion material piled on the seatback frame 21 is sandwiched between the pan frame 22 and the pipe frame 23.

Further, in the upper portion of the seatback frame 21, a portion located at the rear side of a pillar 33 to be described later is provided with a pillar inclination regulating portion 25 which is formed by a downward U-shaped bracket. The pillar inclination regulating portion 25 corresponds to a regulating portion which regulates the rearward rotating (inclining) movement of the pillar 33 when the headrest 30 is located at the sitting position. Furthermore, the pillar inclination regulating portion 25 is provided for each pillar 33 (that is, two pillars), and is welded to the upper end portion of the pipe frame 23.

The seatback 20 with the above-described configuration fits a rotation shaft 20b into a hole portion of a seatback supporting unit 90 (for example, see FIG. 12) fixed to the vehicle body floor 2, and is rotatably supported by the seatback supporting unit 90. Accordingly, the seatback 20 is rotatable in the front to back direction with respect to the vehicle body floor 2, and is movable between the sitting position and the inclining position. In other words, the seatback 20 according to this embodiment is adapted to be inclined forward, and hence may be switched between an upright state and an inclining state. Furthermore, in this embodiment, the seatback 20 is inclined forward along with the flip-up operation of the seat cushion 10. Then, in this embodiment, only the seatback 20 may be independently inclined forward.

Figure 6:
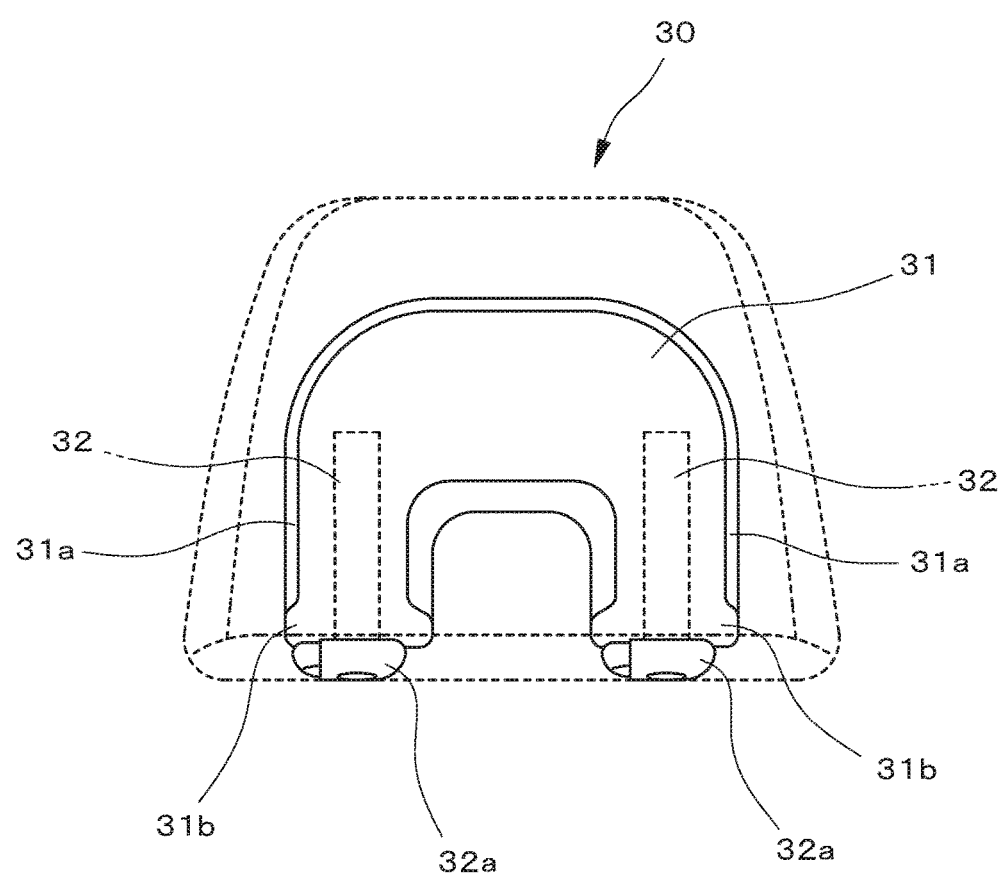
FIG. 6 is a front view illustrative diagram illustrating an inner frame 31 of a headrest 30.

The headrest 30 is provided above the seatback 20 (in other words, the seatback frame 21), and is formed by charging a foaming material between the surface material and the inverse U-shaped inner frame 31 illustrated in FIG. 6. Leg portions 31a which are located at both sides of the inverse U-shaped inner frame 31 are hollow, and each leg portion 31a is provided with a space for accommodating the hollow guide 32. The guide 32 is accommodated inside the leg portion 31a, and is movable forward and backward through an insertion hole (not illustrated) formed in a lower end flange portion 31b of the leg portion 31a of the inner frame 31. Furthermore, the surface material of the headrest 30 is provided with a guide hole (not illustrated) which is formed so that the end of the guide 32 is located at the outside of the surface material.

In the headrest 30 with the above-described configuration, a portion in the periphery of the guide hole in the surface material of the headrest 30 is sandwiched between the lower end flange portion 31b of the leg portion 31a of the inner frame 31 and a lower end flange 32a of the guide 32 in a state where the guide 32 is located at the farthest retracted position inside the leg portion 31a of the inner frame 31 (a state where the guide is accommodated inside the leg portion 31a except for the lower end flange 32a).

Further, in this embodiment, the headrest 30 is supported by the pillars 33 while the pair of pillars 33 (see FIG. 5) formed by metal bars is inserted into the guides 32, and the respective pillars 33 are rotatably supported by a casing 51 of the headrest rotation mechanism 50 to be described later.

Then, the headrest 30 may be rotated by the headrest rotation mechanism 50 until the headrest is inclined forward by about 90° from the state where the headrest stands above the seatback 20. Furthermore, in this embodiment, the headrest 30 is rotated to be inclined forward along with the flip-up operation of the seat cushion 10. Further, only the headrest 30 may be inclined forward.

Headrest Rotation Mechanism

Next, the headrest rotation mechanism 50 will be described.

The headrest rotation mechanism 50 corresponds to a third operation mechanism, and is a mechanism which rotates the pillar 33 forward and inclines the headrest 30 forward so that the headrest 30 held at the sitting position is located at the forward inclining position. The headrest rotation mechanism 50 is fixed to the front upper portion of the seatback frame 21 while being covered by a resinous cover (not illustrated).

As illustrated in FIGS. 7 to 9, the headrest rotation mechanism 50 includes the casing 51, a biasing spring 52, a lock member 53, and a slide member 54.

The casing 51 forms a housing of the headrest rotation mechanism 50, is formed by multi-plying substantially rectangular metal plates in this embodiment, and accommodates therein the lock member 53 or the slide member 54. Further, the casing 51 is attached to the seat back frame 21, extends in the width direction of the seat back frame 21, and supports the pillar 33 so that the pillar is rotatable by the upper portion thereof. The biasing spring 52 is an example of a biasing member that biases each pillar 33 forward, and is provided at the rear surface (the back surface) of the casing 51.

The lock member 53 is a metallic piece member which is engaged with each pillar 33 to hold the pillar 33 in an upright state against the biasing force of the biasing spring 52. Here, the upright state indicates the arrangement state of the pillars 33 when the headrest 30 stands up to be located above the seatback 20 (in other words, a state where the headrest 30 is located at the sitting position).

The configuration of the lock member 53 will be described in more detail. As illustrated in FIG. 9, the pillar 33 includes a vertical portion 33a which extends in the height direction of the vehicle seat S1 (that is, the up and down direction (the height direction) of the seat back frame 21), a horizontal portion 33b which is adjacent to the lower portion of the vertical portion 33a and extends in the right and left direction (that is, the width direction of the seat back frame 21), and a pillar side engagement portion 33c which is formed in a substantially fan shape at the end of the horizontal portion 33b. Then, since the lock member 53 is fitted to a notch 33d formed in the pillar side engagement portion 33c, the lock member is engaged with the pillar 33 to hold the pillar 33 in the upright state.

Further, the lock member 53 is supported inside the casing 51 in a swingable manner, and moves between a position (engagement position) in which a part of the lock member is exposed to the outside of the casing 51 to be fittable to the notch 33d of the pillar side engagement portion 33c and a position (cancel position) in which the exposed portion of the lock member is received in the casing 51 to be separated from the notch 33d.

The slide member 54 is an elongated member (specifically, a ratchet lever) that is accommodated inside the casing 51, and slides in the width direction of the seatback frame 21 to swing the lock member 53. In a normal state, the slide member 54 is located at a position which causes the lock member 53 to reach the engagement position. Then, when the slide member 54 slides toward one end in the longitudinal direction, the lock member 53 reaches the cancel position.

In the headrest rotation mechanism 50 with the above-described configuration, the pillar 33 is held in the upright state against the biasing force of the biasing spring 52 while the lock member 53 is engaged with the pillar side engagement portion 33c of the pillar 33 at the engagement position so that the headrest 30 is held at the sitting position.

When the lock member 53 swings from the engagement position to the cancel position by the sliding movement of the slide member 54, the engagement between the lock member 53 and the pillar side engagement portion 33c is canceled, the pillar 33 rotates forward by the biasing force of the biasing spring 52 so that the headrest 30 is inclined forward. The series of operations are operations of inclining the headrest 30 forward, and correspond to the third operations.

In this embodiment, two paths for applying a driving force to the slide member 54 to slide the slide member are prepared. One path is a path which receives an operation performed by an occupant to independently incline only the headrest 30 forward and directly transmits the operation to the slide member 54 to slide the slide member.

Specifically, the vehicle seat S1 according to this embodiment is equipped with a belt-shaped member ST1 which receives an operation of sliding the slide member 54 by the occupant, and the belt-shaped member ST1 is fastened to one longitudinal end 54a of the slide member 54. Accordingly, when the occupant pulls the belt-shaped member ST1, the slide member 54 slides, and the lock member 53 swings to the cancel position along with the sliding movement.

Further, the belt-shaped member ST1 may be bent at a substantially right angle by abutting against a hook rod 24 attached to the seatback frame 21 at the halfway position of the extension range. That is, the hook rod 24 corresponds to a bending member that abuts against the belt-shaped member ST1 and bends the belt-shaped member ST1.

Figure 2:
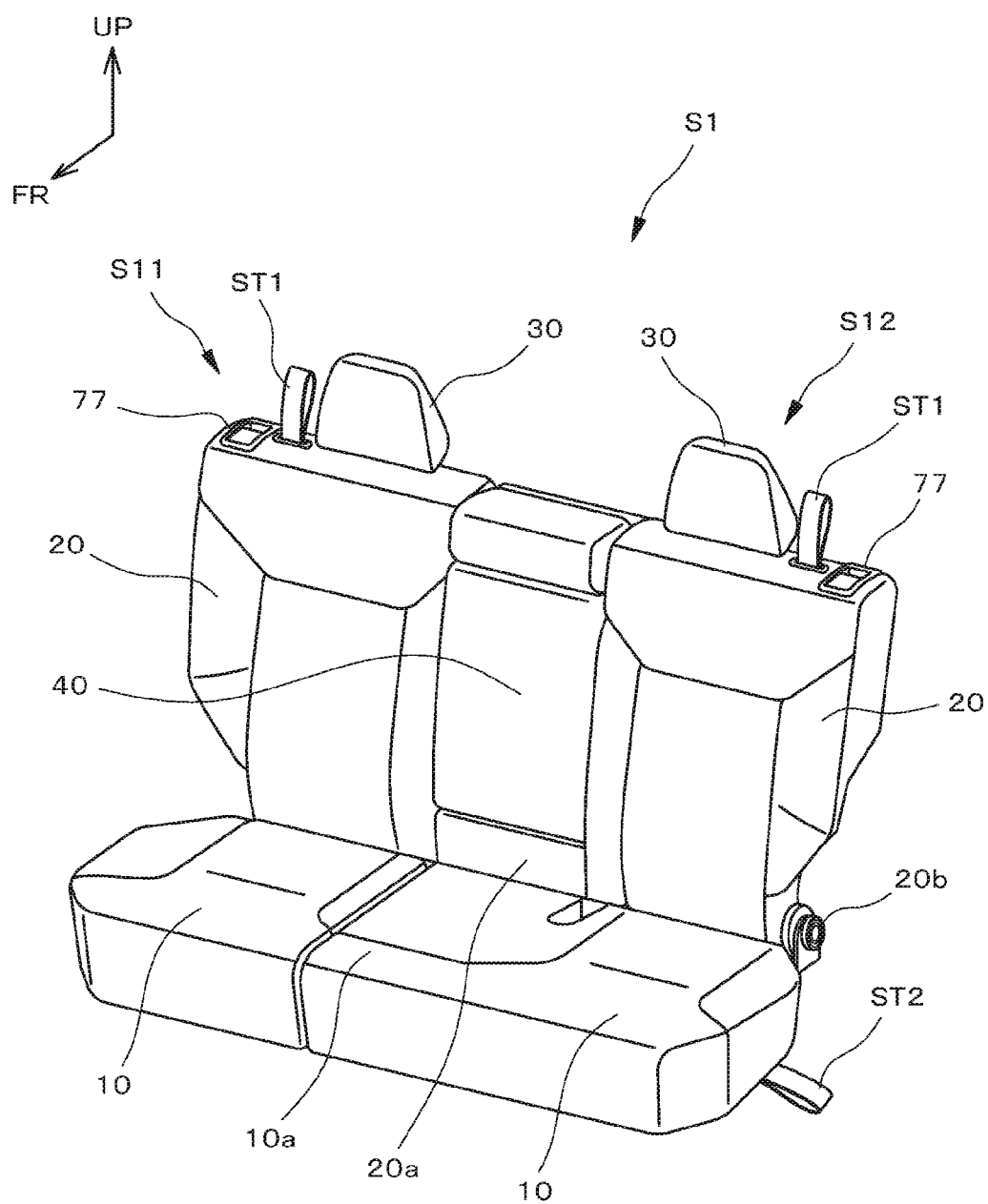
FIG. 2 is a front perspective view of the vehicle seat S1.

Then, the belt-shaped member ST1 passes through a guide hole formed in the surface material of the seatback 20 and protrudes from the portion located at the outside of the vehicle 1 compared to the headrest 30 in the upper end surface of the seatback 20 (see FIG. 2). Accordingly, when the occupant pulls the belt-shaped member ST1 in the up and down direction, the movement direction of the belt-shaped member ST1 changes from the up and down direction to the right and left direction by the action of the hook rod 24 so that the pulling force is transmitted to the slide member 54 as a driving force for sliding the slide member 54 in the width direction of the seat back frame 21. For this reason, the hook rod 24 corresponds to a change portion which changes the operation of pulling the belt-shaped member ST1 in the up and down direction to the sliding movement of the slide member 54 in the width direction of the seat back frame 21.

The other path for applying the driving force for causing the sliding movement to the slide member 54 receives an operation (hereinafter, referred to as a stowing operation) in which the occupant stows the vehicle seat S1, and transmits the stowing operation to the slide member 54 through the flip-up operation of the seat cushion 10. That is, since this path is provided, an operation of flipping up the seat cushion 10 to the flip-up position (the stowed position) is first performed when stowing the vehicle seat S1, such an operation is transmitted to the slide member 54, and the slide member 54 is slid so that the headrest 30 is inclined forward.

Specifically, a stowing operation belt-shaped member ST2 (see FIG. 11) which receives the stowing operation of the vehicle seat S1 by the occupant is provided, and the stowing operation belt-shaped member ST2 is fastened to the seat cushion flipping-up mechanism 60 to be described later. Furthermore, the stowing operation belt-shaped member ST2 extends from the outside of the vehicle 1 in the vehicle seat S1, and is located at the lower portion of the seat cushion 10 when the posture of the vehicle seat S1 is held at the sitting posture.

The seat cushion flipping-up mechanism 60 (more specifically, one end of the cable C is attached to a link 121 of a movable unit 120 to be described later), and the other end of the cable C is attached to the arrangement unit 80 to be described later. Further, a difference cable C extends from the arrangement unit 80, and the front end thereof is hooked to a side wall of an extension portion 54b extending in a direction intersecting with the longitudinal direction at the other longitudinal end side of the slide member 54 (the opposite side to the side for fastening the belt-shaped member ST1).

Under the above-described configuration, when the occupant pulls the stowing operation belt-shaped member ST2 toward the outside of the vehicle 1, the seat cushion flipping-up mechanism 60 is operated so that the seat cushion 10 flips up toward the flip-up position. Then, an operation performed by the seat cushion flipping-up mechanism 60 to flip up the seat cushion 10 (specifically, an operation of rotating the link 121 to be described later forward) is transmitted to the slide member 54 through the cable C and the arrangement unit 80. That is, the cable C attached to the seat cushion flipping-up mechanism 60 is pulled by the operation performed to flip up the seat cushion 10, and the respective operation portions of the arrangement unit 80 are operated by the operation of pulling the cable C, so that the cable C hooked to the extension portion 54b of the slide member 54 is pulled. By the series of operations, the slide member 54 slides so that the lock member 53 swings to the cancel position.

Next, the attachment of the headrest rotation mechanism 50 will be described. As described above, the headrest rotation mechanism 50 is attached to the upper portion of the seatback frame 21. Particularly, in this embodiment, the headrest rotation mechanism is attached to the front side of the seatback frame 21 by a stud bolt Bs.

More specifically, in this embodiment, the respective components of the headrest rotation mechanism 50 are not individually attached, but are attached to the seatback frame 21 while being integrated as a unit. Furthermore, the headrest rotation mechanism 50 is attached to the seatback frame 21 while being assembled to the pillar 33.

Here, in this embodiment, the attachment stud bolt Bs is set to the front side of the seatback frame 21 in advance in the previous step of the attachment of the headrest rotation mechanism 50. The upper and lower portions of the casing 51 of the headrest rotation mechanism 50 are provided with bolt receiving portions 51a which protrude outward. Then, when attaching the headrest rotation mechanism 50 to the seatback frame 21, the headrest rotation mechanism 50 is attached from the front side of the seatback frame 21 through the stud bolt Bs to the bolt hole formed in the bolt receiving portion 51a. In this way, in this embodiment, the headrest rotation mechanism 50 may be attached as one unit, and the casing 51 may be attached from the front side of the seatback frame 21 using the stud bolt Bs. Accordingly, the headrest rotation mechanism 50 may be easily attached, and hence the assembling workability is improved.

Furthermore, in this embodiment, the installation positions of the bolt receiving portions 51a (in other words, the positions of fixing the headrest rotation mechanism 50 to the seatback frame 21) are three positions. Specifically, the bolt receiving portions are provided at two positions on the upper side of the casing 51 of the headrest rotation mechanism 50, and are provided at one position on the lower side of the casing 51. Here, the stud bolts Bs which are received by the bolt receiving portions 51a provided on the upper side of the casing 51 of the headrest rotation mechanism 50 are provided in the pillar inclination regulating portion 25. That is, in this embodiment, the headrest rotation mechanism 50 is fixed to the pillar inclination regulating portion 25.

More specifically, the upper portion of the seatback frame 21 is provided with the pillar inclination regulating portion 25 for each pillar 33, and the stud bolt Bs is set to the front surface of each pillar inclination regulating portion 25 to slightly protrude from the front surface. When the stud bolt Bs passes through the bolt hole of the bolt receiving portion 51a provided on the upper side of the casing 51 of the headrest rotation mechanism 50 and the casing 51 is attached to each pillar inclination regulating portion 25 by the stud bolt Bs, the headrest rotation mechanism 50 is fixed to each pillar inclination regulating portion 25.

In this way, in this embodiment, the headrest rotation mechanism 50 is fixed by effectively using the installation space of the pillar inclination regulating portion 25. Accordingly, the size of the vehicle seat S1 may be decreased. More specifically, the respective pillar inclination regulating portions 25 are located inside compared to both ends of the casing 51 of the headrest rotation mechanism 50 in the right and left direction (the width direction of the seatback frame 21). In this way, since the fixing position of the headrest rotation mechanism 50 is provided in the pillar inclination regulating portions 25 located inside compared to both ends of the casing 51 of the headrest rotation mechanism 50, it is possible to further decrease the size of the vehicle seat S1 compared to a case where the fixing positions are provided at the outside compared to both ends of the casing 51 of the headrest rotation mechanism 50.

Further, the pillar 33 includes the vertical portion 33a which extends in the up and down direction (the height direction) of the seatback frame 21, where the center portion of the front surface of the pillar inclination regulating portion 25 is located at the position of the vertical portion 33a in the width direction of the seat back frame 21, and the stud bolt Bs is set to such a position. That is, in this embodiment, the stud bolt Bs exists on the axis of the vertical portion 33a of the pillar 33. Accordingly, the size of the vehicle seat S1 may be further decreased. Specifically, since a region allocated for the arrangement of the pillar 33 (particularly, the vertical portion 33a) in the width direction of the seat back frame 21 is effectively used to set the stud bolt Bs as a member other than the pillar 33, there is no need to particularly ensure a space for setting the stud bolt Bs, and hence the size of the vehicle seat S1 may be decreased.

Further, in the pillar 33, the lower end of the front surface of the pillar inclination regulating portion 25 is located at the lower position in the up and down direction (the height direction) of the seat back frame 21 compared to the horizontal portion 33b which is adjacent to the vertical portion 33a and extends in the width direction of the seat back frame 21, and the stud bolt Bs is set to such a position. Accordingly, the size of the vehicle seat S1 may be further decreased. Specifically, an empty space is formed below the bonding position between the vertical portion 33a and the horizontal portion 33b (in other words, the bent position of the pillar 33). When this empty space is used to install the stud bolt Bs, there is no need to separately ensure a space for setting the stud bolt Bs, and hence the size of the vehicle seat S1 may be decreased.

The stud bolt Bs which is received by the bolt receiving portion 51a provided at the lower side of the casing 51 of the headrest rotation mechanism 50 is set to the pan frame 22 of the seatback frame 21. Particularly, in this embodiment, the stud bolt Bs is set to a portion overlapping a reinforcing plate 26 in the pan frame 22. In this way, in this embodiment, since the stud bolt Bs is set to the highly rigid portion in the pan frame 22 and the headrest rotation mechanism 50 is fixed by such a stud bolt Bs, the headrest rotation mechanism 50 is appropriately provided, and hence the respective components of the headrest rotation mechanism 50 are stably operated.

Seat Cushion Flipping-Up Mechanism

The seat cushion flipping-up mechanism 60 is an example of the flip-up mechanism, and corresponds to a first operation mechanism. When the stowing operation of the vehicle seat S1 by the occupant is transmitted, an operation of flipping up the seat cushion 10 toward the flip-up position is performed as a start operation of stowing the vehicle seat S1. The seat cushion flipping-up mechanism 60 is covered by a resinous cover (not illustrated), and is provided on the vehicle body floor 2 to be located below the seat cushion 10 when the seat cushion 10 is located at the sitting position.

Figure 10:
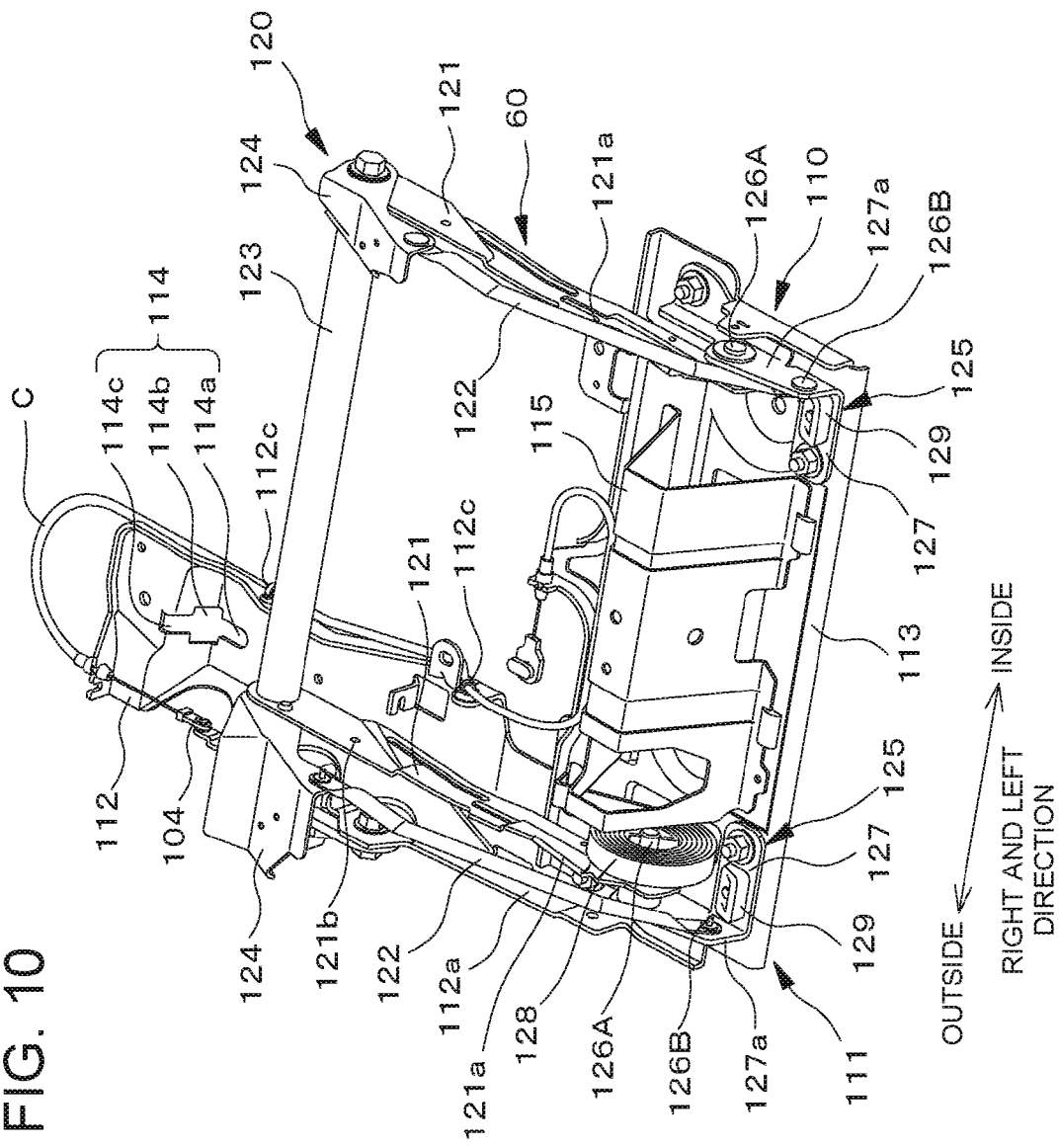
FIG. 10 is a front perspective view (second diagram) of a seat cushion flipping-up mechanism 60.
Figure 11:
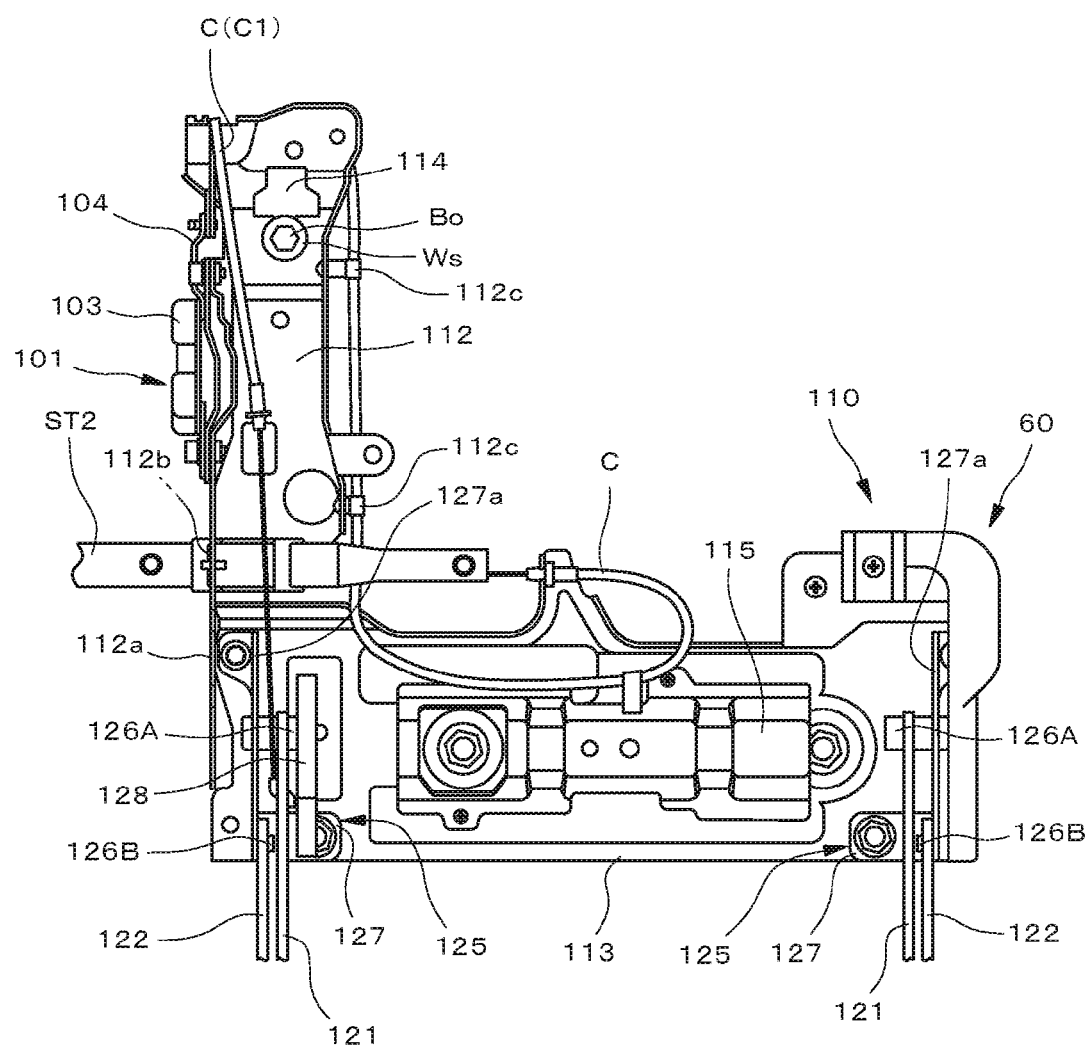
FIG. 11 is a plan view diagram illustrating the seat cushion flipping-up mechanism 60.

As illustrated in FIGS. 4, 10, and 11, the seat cushion flipping-up mechanism 60 includes two components, where one component is an attachment unit 110 which is attached to the vehicle body floor 2, and the other component is a movable unit 120 which is disposed on the attachment unit 110 and swings (rotates) with respect to the attachment unit 110 (in other words, the vehicle body floor 2).

The attachment unit 110 mainly includes an attachment plate 111 which is formed in an L-shape in a top view. In the attachment plate 111, the first plate portion 112 which extends in the front to back direction of the vehicle 1 is fixed to the vehicle body floor 2 by the bolt Bo and the washer Ws fastened in the vehicle body floor 2 (see FIG. 11). Here, the rear end of the first plate portion 112 is provided with an attachment hole 114 formed in an elongated hole shape, and when the bolt Bo and the washer Ws set to the vehicle body floor 2 are fitted to the attachment hole 114, the attachment unit 110 is disposed on the vehicle body floor 2.

Furthermore, the center portion 114b of the attachment hole 114 in the longitudinal direction has a width that is slightly larger than that of the front end 114a or the rear end 114c. When fitting the bolt Bo and the washer Ws to the attachment hole 114 by using such a configuration, the bolt Bo and the washer Ws first pass through the center portion 114b of the attachment hole 114 in the longitudinal direction, and the attachment unit 110 is positioned by displacing the position of the attachment unit 110 so that the bolt Bo is fitted to the front end 114a of the attachment hole 114 in the longitudinal direction.

Further, a locking portion 101 of the striker lock mechanism 100 is attached to the substantial center portion of the first plate portion 112 in the longitudinal direction. The locking portion 101 includes a hook-shaped lock piece 102 and a housing 103 which accommodates the lock piece 102 in a swingable state. In a state where the lock piece 102 is engaged with a striker 105 to be described later, the seat cushion 10 is fixed onto the vehicle body floor 2 at the sitting position. When the lock piece 102 swings, the striker 105 is canceled from the engagement state with the lock piece 102, and hence the seat cushion 10 is canceled from the state where the seat cushion is fixed onto the vehicle body floor 2 to be movable.

Further, one side portion of the first plate portion 112 is provided with an upright wall portion 112a, and in the upright wall portion 112a, a slit 112b through which the stowing operation belt-shaped member ST2 passes through is formed at a slightly front position compared to the attachment position of the locking portion 101. The stowing operation belt-shaped member ST2 which passes through the slit 112b is disposed on the first plate portion 112 to intersect with the first plate portion 112. Further, one end of the cable C is connected to the end of the stowing operation belt-shaped member ST2 (the end at the inside of the vehicle 1 when viewed from the first plate portion 112), and path defining portions 112c for defining the wiring path when wiring the cable C are provided at an appropriate interval in the side portion of the first plate portion 112 (the side portion opposite to the position of the upright wall portion 112a).

Then, the other end of the cable C is connected to a connection piece 104 connected to the lock piece 102. Accordingly, when the stowing operation belt-shaped member ST2 is pulled, the cable C pulls the lock piece 102 through the connection piece 104. As a result, the lock piece 102 swings so that the engagement between the lock piece 102 and the striker 105 is canceled.

In the attachment plate 111, a second plate portion 113 which extends in the right and left direction of the vehicle 1 (the width direction of the vehicle seat S1) is a base portion of the movable unit 120, and its center portion in the longitudinal direction is provided with a submarine bracket 115 which prevents a submarine phenomenon in which the occupant sitting on the seat cushion 10 moves under the waist belt in the event of the collision of the vehicle 1.

The movable unit 120 has a substantially door-like structure, and is fixed to the second plate portion 113 of the attachment plate 111 by a bolt. The movable unit 120 includes a pair of links 121, a pair of pipe rods 122, a connection bar 123 which connects the links 121 to each other, an attachment bracket 124 for attaching the seat cushion 10, and a pair of support mechanisms 125 which rotatably supports the links 121 and the pipe rods 122. These components are combined to be integrated as a unit, and are integrally attached as a unit when being attached to the second plate portion 113 of the attachment plate 111.

The pair of links 121 is an elongated body which is formed by performing a process such as beading on a metal sheet, and is located at both side portions of the movable unit 120. Each link 121 is rotatably supported in a manner such that a rotation shaft 126A is fitted to a guide hole (not illustrated) formed in its lower end. Further, the connection bar 123 which connects the links 121 to each other is attached to the upper ends of the respective links 121. Further, the attachment bracket 124 is attached to the outer surfaces of the upper ends of the respective links 121. Furthermore, the connection bar 123 and the attachment bracket 124 are attached to the upper ends of the links 121 by a bolt according to a common fastening type.

The pair of pipe rods 122 is disposed in parallel to the links 121, and is supported to be rotatable in the same direction as the rotation direction of the link 121 in a manner such that a rotation shaft 126B is fitted to a guide hole (not illustrated) formed in the lower end. Further, the attachment bracket 124 is pinned to the upper end of each pipe rod 122. Then, in this embodiment, the seat cushion 10 is supported by the pair of links 121 and the pair of pipe rods 122 through the attachment bracket 124. Further, each pipe rod 122 follows the rotation of the link 121 to rotate in the same direction as the rotation direction of the link 121.

Further, among the pair of links 121 and the pipe rods 122, the striker 105 of the striker lock mechanism 100 is attached to the lower surface of the attachment bracket 124 attached to the link 121 and the pipe rod 122 facing the outside of the vehicle 1. Then, when the link 121 and the pipe rod 122 rotate to fall rearward when viewed from the rotation shafts 126A and 126B, the striker 105 reaches a position where the striker may be engaged with the lock piece 102 of the locking portion 101 provided in the attachment plate 111 (more specifically the first plate portion 112).

The pair of support mechanisms 125 is used to rotatably support the link 121 and the pipe rod 122, and includes a base bracket 127 and a damper rubber 129 other than the rotation shafts 126A and 126B as illustrated in FIGS. 4, 10, and 11.

The base bracket 127 is a metal sheet member that is substantially formed in a Z-shape in a top view, forms the base of the movable unit 120, and is fixed to the second plate portion 113 of the attachment plate 111 by a bolt. Further, in the base bracket 127, a portion which extends in the front to back direction of the vehicle 1 becomes an upright wall portion 127a, and the rotation shafts 126A and 126B are attached to the upright wall portion 127a.

The damper rubber 129 abuts against the front end of the link 121 to absorb an impact generated in the link 121 when the link 121 rotates and reach the forward limit position by the biasing force of the spiral spring 128. The damper rubber 129 is fixed to the base bracket 127 to be slightly located at the front side of the portion as the rotation support point of the link 121.

Furthermore, in this embodiment, in order to prevent the cutting of the damper rubber 129 due to the abutting (collision) of the link 121 against the damper rubber 129, an abutting portion 121a that is located at a position abutting against the damper rubber 129 in the longitudinal direction of the link 121 is bent, and the front end of the abutting portion 121a is rounded.

A spiral spring 128 is provided in the support mechanism 125 which is located at the outside of the vehicle 1 in the pair of support mechanisms 125. The spiral spring 128 is a biasing member that biases the link 121 so that the link 121 is inclined forward. One end of the spiral spring 128 is locked to the rotation shaft 126A and the other end thereof is locked to a protrusion portion (not illustrated) protruding from the side surface of the link 121 while the link 121 falls rearward (in other words, before the seat cushion 10 flips up).

With the above-described configuration, the seat cushion 10 is held at the sitting position while receiving the biasing force of the spiral spring 128 through the link 121 (in other words, against the biasing force of the spiral spring 128) when the striker 105 is engaged with the lock piece 102.

When the lock piece 102 is pulled to swing the lock piece 102 and the engagement between the striker 105 and the lock piece 102 is canceled, the link 121 rotates forward by the biasing force of the spiral spring 128. As a result, the seat cushion 10 flips up toward the flip-up position. The series of operations are a series of operations for flipping up the seat cushion 10, and correspond to a first operation.

Furthermore, in the case illustrated in FIGS. 4, 10, and 11, the spiral spring 128 is provided in only one of the pair of links 121, but the present invention is not limited thereto. For example, the spiral spring 128 may be provided for each of both links 121.

Further, in this embodiment, an insertion hole 121b is provided in the course of one link 121 (the link 121 located at the outside of the vehicle 1) in the longitudinal direction, and one end of the cable C is inserted into the insertion hole 121b. The other end of the cable C is connected to the arrangement unit 80 (more specifically, a first rotation member 83). Thus, since the link 121 rotates when the seat cushion 10 flips up, the cable C connected to the link 121 is pulled. Finally, the respective components of the arrangement unit 80 connected with the cable C are operated by using the pulling force of the cable C. Furthermore, the configuration and the operation of the arrangement unit 80 will be described in detail later.

Seatback Inclining Mechanism

Next, the seatback inclining mechanism 70 will be described.

Figure 12:
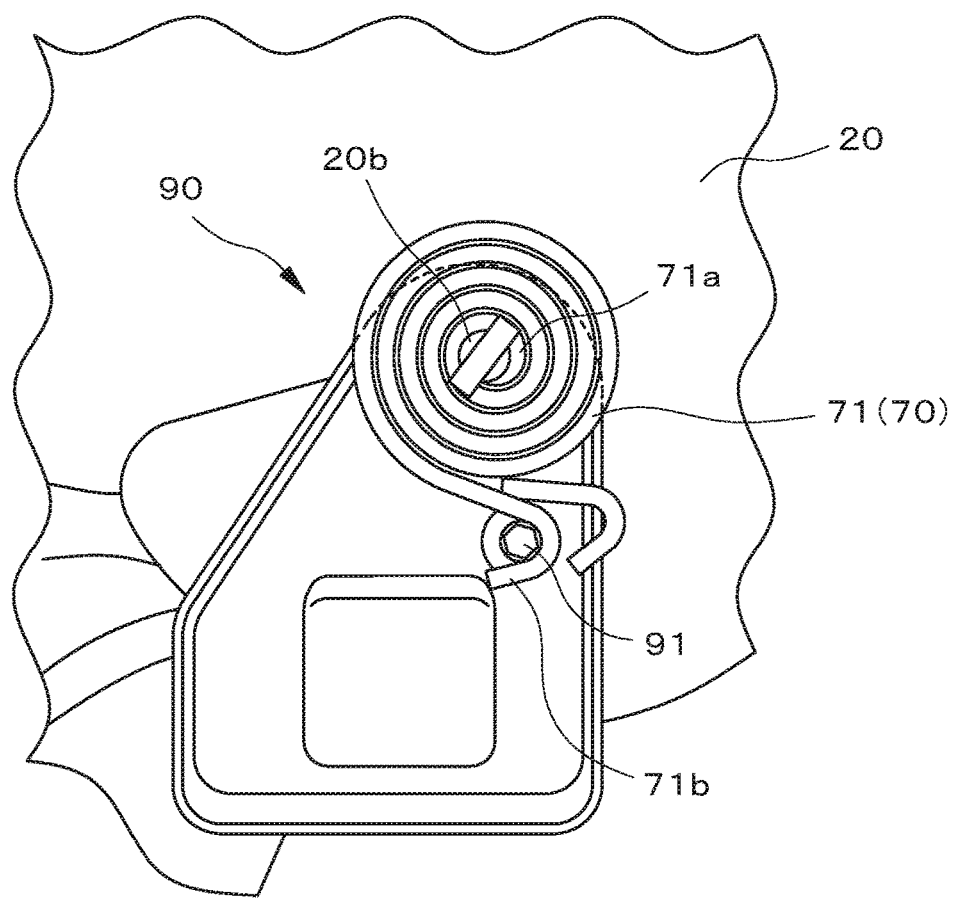
FIG. 12 is a side view diagram illustrating a seatback supporting unit 90.

The seatback inclining mechanism 70 is an example of the second operation mechanism and is a mechanism that rotates the seatback 20, rotatably supported by the seatback supporting unit 90 illustrated in FIG. 12 so that the seatback is inclined forward. The seatback inclining mechanism 70 includes a biasing spring 71 illustrated in FIG. 12 and the lock mechanism 72 illustrated in FIG. 13.

The biasing spring 71 is an example of the biasing member that biases the seatback 20 held at the sitting position so that the seatback is inclined forward, and is specifically a spiral spring which is provided in the seatback supporting unit 90. One end 71a of the biasing spring 71 is locked to the rotation shaft 20b of the seatback 20, and the other end 71b of the biasing spring 71 is locked to a locking pin 91 provided in the seatback supporting unit 90 in a protruding manner.

The lock mechanism 72 is attached to the side portion facing the outside of the vehicle 1 in the seatback frame 21 through a bracket (not illustrated). The lock mechanism 72 includes a lock piece 73 which is engaged with a striker 74 provided in the vehicle body, and holds the seatback 20 at the sitting position against the biasing force of the biasing spring 71 by the engagement between the lock piece 73 and the striker 74. Here, the vehicle body indicates a portion excluding the vehicle seat S1 in the vehicle 1.

Figure 13:
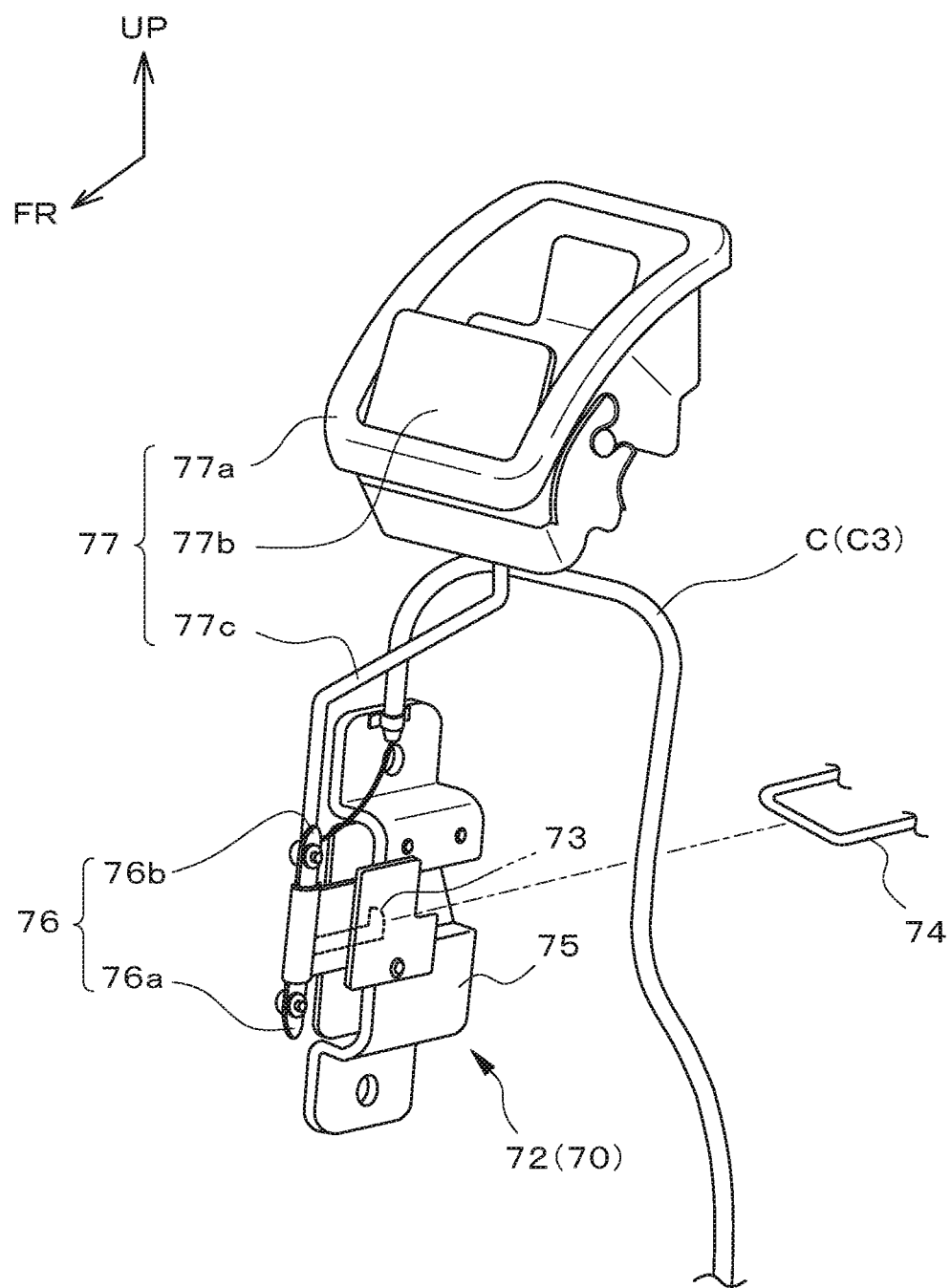
FIG. 13 is a front perspective view of a lock mechanism 72 and an operation unit 77.

The configuration of the lock mechanism 72 will be described in more detail. As illustrated in FIG. 13, the lock mechanism 72 includes the lock piece 73, a base portion 75, and a connection portion 76. As described above, the lock piece 73 is a hook-shaped member which is engaged with the striker 74, and is rotatably supported by the base portion 75. Here, the lock piece 73 rotates about a support shaft (not illustrated) uprightly formed in the base portion 75 to move between a position (engageable position) where the lock piece may be engaged with the striker 74 and a position (un-engageable position) where the lock piece may not be engaged with the striker 74.

Furthermore, the lock piece 73 is biased by a twist spring (not illustrated) in a direction in which the lock piece faces the engageable position in the rotation direction. When the lock piece 73 is rotated from the engageable position to the un-engageable position against the biasing force of the twist spring, the engagement state between the lock piece 73 and the striker 74 may be canceled.

The connection portion 76 is formed as an oval metal sheet, and is attached to the base portion 75 to be slidable in the up and down direction. When the lock piece 73 is attached to a lower end 76a (one end) of the connection portion 76 and the connection portion 76 slides upward, the lock piece 73 rotates in a direction facing the un-engageable position. Further, an upper end 76b (the other end) of the connection portion 76 is connected with a connecting rod 77c of the operation unit 77 to be described later and the cable C extending from the arrangement unit 80.

In the seatback inclining mechanism 70 with the above-described configuration, when the lock piece 73 is engaged with the striker 74, the seatback 20 is held at the sitting position against the biasing force of the biasing spring 71. In other words, the striker 74 holds the seatback 20 in the upright state against the biasing force of the biasing spring 71 while the seatback 20 is engaged with the vehicle body, more specifically, the striker 74. For this reason, the striker 74 corresponds to an engagement portion which is engaged with the seatback 20 to hold the seatback 20 in the upright state against the biasing force of the biasing spring 71.

Then, when the connection portion 76 slides upward, the lock piece 73 rotates from the engageable position toward the un-engageable position so that the engagement between the lock piece 73 and the striker 74 is canceled. Accordingly, the seatback 20 rotates to be inclined forward (fall) about the rotation shaft 20b by the biasing force of the biasing spring 71 so that the seatback reaches the inclining position. The series of operations are operations of inclining the seatback 20 forward, and correspond to a second operation.

Furthermore, in this embodiment, a damper mechanism (not illustrated) is provided in the seatback supporting unit 90, and when the inclination angle of the seatback 20 reaches a predetermined angle, the inclining speed (rotating speed) gradually decreases by the operation of the damper mechanism. Accordingly, since the seatback 20 reaches the inclining position at a gentle speed, it is possible to prevent an accident caused by the collision with the seatback 20 even when the seatback 20 is inclined while a person or an object exists between the seatback 20 and the vehicle body floor 2.

In this embodiment, there are prepared two paths that apply a driving force for sliding the connection portion 76 upward to the connection portion (in other words, a driving force for rotating the lock piece 73 toward the un-engageable position). One path is a path that receives an operation performed by the occupant to independently incline only the seatback 20 forward and transmits the operation to the lock piece 73 through the connection portion 76.

Specifically, the upper end of the seatback 20 is provided with the operation unit 77 that receives an operation performed by the occupant to independently incline only the seatback 20 forward. Furthermore, in the upper end surface of the seatback 20, the arrangement position of the operation unit 77 is located at the outside of the vehicle 1 compared to the belt-shaped member ST1 when viewed from the headrest 30 (see FIG. 2). As illustrated in FIG. 13, the operation unit 77 includes the operation cover 77a and the operation lever 77b which is rotatably supported by the operation cover 77a. The operation cover 77a has a concave shape in which the operation lever 77b may be accommodated. Then, the operation cover 77a is fixed to the seatback 20 while its flange abuts against the upper end surface of the seatback 20. More specifically, the operation cover is fixed to the attachment bracket 27 (see FIG. 5) provided at the shoulder position of the seatback frame 21.

The operation lever 77b is biased in a direction (specifically, a direction facing forward inside the operation cover 77a) in which the operation lever is accommodated inside the operation cover 77a in the rotation direction of the operation lever 77b by a biasing mechanism (not illustrated). Further, the connecting rod 77c which is formed by a metal member substantially formed in a zigzag shape is connected to a predetermined position of the operation lever 77b. The connecting rod 77c moves upward along with the upward rotation of the operation lever 77b (specifically, the rearward rotation of the operation lever 77b inside the operation cover 77a).

In the operation unit 77 with the above-described configuration, when the occupant rotates the operation lever 77b upward, the connecting rod 77c moves upward so that the above-described operation is transmitted to the connection portion 76 as a driving force for sliding the connection portion 76 upward. Finally, the upward sliding movement of the connection portion 76 is transmitted to the lock piece 73, and the lock piece 73 rotates toward the un-engageable position against the biasing force of the twist spring. Accordingly, the engagement state of the lock piece 73 which is engaged with the striker 74 so far is canceled. As a result, the seatback 20 rotates so that only the seatback is independently inclined forward. As described above, when the occupant rotates the operation lever 77b upward, the seatback 20 is independently inclined forward.

Furthermore, when the engagement between the lock piece 73 and the striker 74 is first canceled, the lock piece 73 rotates in the opposite direction, and is maintained in a state where the engagement with the striker 74 may not be performed until the lock piece returns to the engageable position.

The other path which applies a driving force for sliding the connection portion 76 upward to the connection portion is a path which receives an operation performed by the occupant to stow the vehicle seat S1 and transmits the operation to the connection portion 76. That is, this path is used to transmit such an operation of flipping up the seat cushion 10 to the flip-up position when stowing the vehicle seat S1 to the connection portion 76.

Specifically, as described in the section of the headrest rotation mechanism, the vehicle seat S1 is provided with the stowing operation belt-shaped member ST2 which receives the stowing operation of the vehicle seat S1. One end of the cable C is attached to the seat cushion flipping-up mechanism 60 (more specifically, the link 121 of the movable unit 120), and the other end of the cable C is attached to the arrangement unit 80 to be described later. Further, the other cable C extends from the arrangement unit 80, and its front end is connected to the upper end 76b of the connection portion 76.

Under the above-described configuration, when the occupant pulls the stowing operation belt-shaped member ST2, the seat cushion flipping-up mechanism 60 is operated, and the seat cushion 10 flips up toward the flip-up position. Then, the flip-up operation is transmitted to the connection portion 76 through the cable C and the arrangement unit 80. As a result, the cable C attached to the seat cushion flipping-up mechanism 60 is pulled, and the respective operation portions of the arrangement unit 80 are operated by the operation of pulling the cable C, so that the cable C hooked to the upper end 76b of the connection portion 76 is pulled by the operations of the respective operation portions of the arrangement unit 80. By the above-described series of operations, the connection portion 76 slides upward, and the lock piece 73 swings toward the un-engageable position, so that the engagement with the striker 74 is canceled.

That is, in this embodiment, a cancel mechanism 200 is provided which cancels the engagement between the striker 74 and the seatback 20 by using the flip-up operation using the seat cushion flipping-up mechanism 60. By the series of movements of the respective components of the cancel mechanism 200, the connection portion 76 slides upward, and the lock piece 73 rotates toward the un-engageable position. Then, as in the case of the operation unit 77, the engagement state of the lock piece 73 engaging with the striker 74 so far is canceled, and the seatback 20 is inclined forward to rotate to the position of the seat cushion 10 before the flip-up operation. Then, the lock piece 73 rotates in the opposite direction, and is maintained in a state where the lock piece may not be engaged with the striker 74 until the lock piece returns to the engageable position.

Arrangement Unit

Next, the arrangement unit 80 will be described.

The arrangement unit 80 corresponds to a drive mechanism, and is a device which interlocks the operation of inclining the seatback 20 forward and the operation of inclining the headrest 30 forward with the operation of flipping up the seat cushion 10 when stowing the vehicle seat S1.

Specifically, the arrangement unit 80 is operated to perform the operation (the second operation) of inclining the seatback 20 forward on the seatback inclining mechanism 70 and to perform the operation (the third operation) of inclining the headrest 30 forward on the headrest rotation mechanism 50 by using the flip-up operation (the first operation) of the seat cushion flipping-up mechanism 60.

More specifically, a movable member (for example, a first rotation member 83 or a second rotation member 84 to be described later) inside the arrangement unit 80 uses the rotation operation of the link 121 of the seat cushion flipping-up mechanism 60 as the driving force, where the operation is performed to flip up the seat cushion 10. Then, the lock member 53 of the headrest rotation mechanism 50 swings to the cancel position by the operation of the movable member and the lock piece 73 of the seatback inclining mechanism 70 rotates toward the un-engageable position. That is, the arrangement unit 80 is a unit which transmits the rotation operation of the link 121 of the seat cushion flipping-up mechanism 60 to the headrest rotation mechanism 50 and the seatback inclining mechanism 70 and operates these mechanisms.

In order to realize the above-described function, the arrangement unit 80 is connected to each of the link 121 of the seat cushion flipping-up mechanism 60, the slide member 54 of the headrest rotation mechanism 50, and the connection portion 76 of the seatback inclining mechanism 70 through the cable C as the transmitting member. Further, the arrangement unit 80 is connected to the inclination angle detecting mechanism 130 (the inclination angle detecting mechanism 130 will be described later) by the cable C as the transmitting member. That is, four cables C extend from the arrangement unit 80.

Furthermore, in the description below, for convenience of description, the cable connected to the link 121 of the seat cushion flipping-up mechanism 60 is referred to as a first cable C1, the cable connected to the slide member 54 of the headrest rotation mechanism 50 is referred to as a second cable C2, the cable connected to the connection portion 76 of the seatback inclining mechanism 70 is referred to as a third cable C3, and the cable connected to the inclination angle detecting mechanism 130 is referred to as a fourth cable C4 in order to distinguish the four cables C extending from the arrangement unit 80.

In this embodiment, as illustrated in FIG. 5, the arrangement unit 80 is fixed to a portion slightly close to the outside of the vehicle 1 compared to the center in the width direction of the seatback 20 in the front surface of the pan frame 22 constituting the seatback frame 21 by a bolt. The attachment of the arrangement unit 80 will be described later in detail.

The specific configuration of the arrangement unit 80 will be described. As illustrated in FIG. 14, the arrangement unit 80 mainly includes a casing 81, a rotation shaft 82, a first rotation member 83, a second rotation member 84, a third rotation member 85, an engagement pin 86, a cushioning rubber 87, a first coil spring 88a, a second coil spring 88b, and a third coil spring 88c. Further, as described above, the arrangement unit 80 is connected to the seat cushion flipping-up mechanism 60 by the first cable C1, is connected to the headrest rotation mechanism 50 by the second cable C2, is connected to the seatback inclining mechanism 70 by the third cable C3, and is connected to the inclination angle detecting mechanism 130 to be described later by the fourth cable C4. Hereinafter, the respective components will be described.

The casing 81 has a substantially fan-shaped outer shape in a top view, and is provided at the front side of the operation portion of the arrangement unit 80 (specifically, the first rotation member 83, the second rotation member 84, the third rotation member 85, and the like) to cover the operation portion. Further, the casing 81 includes an attachment hole (not illustrated in FIG. 14) which is formed to attach the rotation shaft 82.

Further, a circular-arc guide slit 81b is formed in a portion close to the outer edge of the casing 81. The guide slit 81b serves as a guide portion when the first rotation member 83 rotates, and is formed in the rotation direction of the first rotation member 83. Furthermore, in this embodiment, the casing 81 is provided with a step at the formation position of the guide slit 81b, and a center region 81c of the casing 81 adjacent to the guide slit 81b is slightly recessed to the back side compared to the outer region 81d located at the outside compared to the guide slit 81b in the thickness direction of the casing 81.

The rotation shaft 82 is a member that rotatably supports the first rotation member 83 and the second rotation member 84, and is detachably attached to the casing 81. Furthermore, in this embodiment, the attachment portion of the rotation shaft 82 in the rear surface of the casing 81 is raised by one level from the periphery thereof, and forms a pedestal (not illustrated) of the rotation shaft 82. The first rotation member 83 is a metal sheet member that rotates about the rotation shaft 82, and extends from the rotation shaft 82 toward the guide slit 81b. One end (the end near the guide slit 81b) in the extension direction of the first rotation member 83 is provided with a cable locking portion 83a which locks one end of the first cable C1 and a tongue-shaped portion 83b which passes through the guide slit 81b and goes around from the rear surface of the casing 81 to the front surface thereof.

Further, a tongue-shaped engagement portion 83c which extends from the side portion of the first rotation member 83 and is engaged with the surface of the second rotation member 84 (specifically, the surface of the outermost edge 84d of the second rotation member 84) is provided at the halfway position of the first rotation member 83 in the extension direction. Furthermore, the first coil spring 88a is attached to one end of the first rotation member 83 in the extension direction, and the first coil spring 88a biases the first rotation member 83 toward one end position in its rotation range (specifically, a position where the first rotation member 83 is normally located).

With the above-described configuration, the first rotation member 83 is normally biased by the first coil spring 88a, and is located at one end position in its rotation range. When the first cable C1 is pulled toward the link 121 by the rotation of the link 121 of the seat cushion flipping-up mechanism 60, one end of the first rotation member 83 in the extension direction is pulled through the cable locking portion 83a so that the first rotation member 83 rotates from one end position toward the other end position in the rotation range against the biasing force of the first coil spring 88*a*.

Furthermore, when the first rotation member 83 rotates, the tongue-shaped portion 83*b* of the first rotation member 83 moves inside the guide slit 81*b* along the guide slit 81*b*, and the tongue-shaped engagement portion 83*c* of the first rotation member 83 moves on the surface of the second rotation member 84 along the surface. Accordingly, the first rotation member 83 may appropriately rotate within the set rotation range.

Specifically, the first coil spring 88*a* may be attached to or the first cable C1 may be connected to a position (specifically, one end in the extension direction) slightly away from the rotation shaft 82 as a support point in the first rotation member 83. For this reason, there is a possibility that the first rotation member 83 may be buckled so that its extension direction is curved, and the first rotation member may not easily rotate in the appropriate rotation range when the buckling is generated. In order to prevent such an accident, in this embodiment, the casing 81 is provided with the guide slit 81*b*, the tongue-shaped portion 83*b* of the first rotation member 83 passes through the guide slit 81*b*, and the tongue-shaped engagement portion 83*c* of the first rotation member 83 is engaged with the outermost edge 84*d* of the second rotation member 84 and moves on the surface of the second rotation member 84. Accordingly, since the buckling of the first rotation member 83 is regulated, the first rotation member may appropriately rotate in the set rotation range.

Furthermore, a portion of the first rotation member 83 located at the halfway position in the extension direction is provided with a protrusion portion 83*d* which slightly protrudes more than the other portions. The protrusion portion 83*d* is a portion which collides with the cushioning rubber 87 to be described later when the first rotation member 83 returns from the other end position to one end position in the rotation range by the biasing force of the first coil spring 88*a*. Further, a circular-arc hole (hereinafter, a circular-arc hole 83*e*) is formed at the halfway position of the first rotation member 83 in the extension direction, and the engagement pin 86 to be described later passes through the circular-arc hole 83*e*. Furthermore, an attachment hole (not illustrated) for attaching the rotation shaft 85*a* of the third rotation member 85 is formed in the vicinity of the circular-arc hole 83*e*.

The second rotation member 84 is a substantially fan-shaped metal sheet member that overlaps the first rotation member 83 at the opposite side to the casing 81 (the second rotation member overlaps on the first rotation member 83 in the state illustrated in FIG. 14) and rotates about the rotation shaft 82. The outer edge of the second rotation member 84 is provided with a connection hole 84*e* for connecting the ends of the second cable C2 and the third cable C3. Then, when the second rotation member 84 rotates from one end position toward the other end position in its rotation range, the two cables C are pulled.

Further, the second coil spring 88*b* is attached to the vicinity of the connection position of the second cable C2 and the third cable C3 in the outer edge of the second rotation member 84. The second coil spring 88*b* biases the second rotation member 84 toward one end position (specifically, a position where the second rotation member 84 is normally located) in its rotation range.

Further, the second rotation member 84 is provided with a guide hole 84*a*, through which the engagement pin 86 to be described later passes, formed in the rotation direction of the second rotation member 84. The guide hole 84*a* has a width sufficiently larger than the outer diameter of the engagement pin 86. Particularly, the width of the end of the guide hole 84*a* located at one end in the rotation direction of the second rotation member 84 is larger than the width of the other portion. That is, in this embodiment, a step is formed at a position close to one end of the guide hole 84*a* in the rotation direction of the second rotation member 84. In other words, a convex portion 84*b* which protrudes toward the inside of the guide hole 84*a* is formed at one end of the second rotation member 84 in a portion provided with the edge of the guide hole 84*a* in the rotation direction of the second rotation member 84.

The engagement pin 86 is uprightly formed in the third rotation member 85 to be described later, and moves along with the third rotation member 85. Then, the engagement pin 86 is locked to the convex portion 84*b* to be engaged with the second rotation member 84, and moves inside the guide hole 84*a* while climbing over the convex portion 84*b* to cancel the engagement state with the second rotation member.

The second rotation member 84 with the above-described configuration is normally biased by the second coil spring 88*b* to be located at one end position in the rotation range. At this time, the engagement pin 86 is located at the side portion of the convex portion 84*b* (more specifically, on end side compared to the convex portion 84*b* in the rotation direction of the second rotation member 84). Then, when the engagement pin 86 moves inside the guide hole 84*a* to be locked to the convex portion 84*b*, the second rotation member 84 is pressed from one end position toward the other end position in its rotation range by the engagement pin 86.

Then, the second rotation member 84 rotates toward the other end position in the rotation range against the biasing force of the second coil spring 88*b* by the pressing force of the engagement pin 86 so that the second cable C2 and the third cable C3 are pulled. As a result, the seatback inclining mechanism 70 is operated so that the engagement between the striker 74 and the seatback 20 is canceled. For this reason, the second rotation member 84 may be a rotation body which rotates to cancel the engagement between the striker 74 and the seatback 20.

When the engagement pin 86 moves inside the guide hole 84*a* to climb over the convex portion 84*b*, the engagement between the second rotation member 84 and the engagement pin 86 is canceled. Accordingly, the second rotation member 84 is canceled from the pressing by the engagement pin 86 and is biased by the second coil spring 88*b* to return to one end position in the rotation range.

Furthermore, a protrusion portion 84*c* is formed at a position located at one end of the second rotation member 84 in the rotation direction in the outer edge of the second rotation member 84. The protrusion portion 84*c* is a portion that collides with the cushioning rubber 87 to be described later when the second rotation member 84 returns from the other end position toward one end position in the rotation range by the biasing force of the second coil spring 88*b*. Further, in the second rotation member 84, the outermost edge 84*d* farthest from the rotation shaft 82 is formed in a circular-arc shape, and its surface is provided with the tongue-shaped engagement portion 83*c* of the first rotation member 83. Then, the tongue-shaped engagement portion 83*c* is engaged with the outermost edge 84*d* and moves along the surface of the outermost edge 84*d*.

The third rotation member 85 is a metal sheet member that is substantially formed in a gourd bowl shape and rotates about the rotation shaft 85*a* attached to the first rotation member 83. The third rotation member 85 overlaps the first rotation member 83 at the position of the casing 81 (the third rotation member overlap beneath the first rotation member 83 in the state illustrated in FIG. 14), and the columnar engagement pin 86 is uprightly formed on the surface thereof. The engagement pin 86 passes through the circular-arc hole 83e formed in the first rotation member 83, and passes through the guide hole 84a of the second rotation member 84.

Further, the third coil spring 88c is attached to one end of the third rotation member 85. The other end of the third coil spring 88c is locked to the other end (the end near the position of the rotation shaft 82) of the first rotation member 83 in the extension direction, and biases the third rotation member 85 so that the outer peripheral surface of the engagement pin 86 abuts against the inner edge of the circular-arc hole 83e. The third rotation member 85 rotates relative to the first rotation member 83 by the biasing force of the third rotation member 85, and the outer peripheral surface of the engagement pin 86 is normally pressed against the inner edge of the circular-arc hole 83e. When the first rotation member 83 rotates in such a state, the third rotation member 85 and the engagement pin 86 rotate along with the first rotation member 83.

Figure 15B:
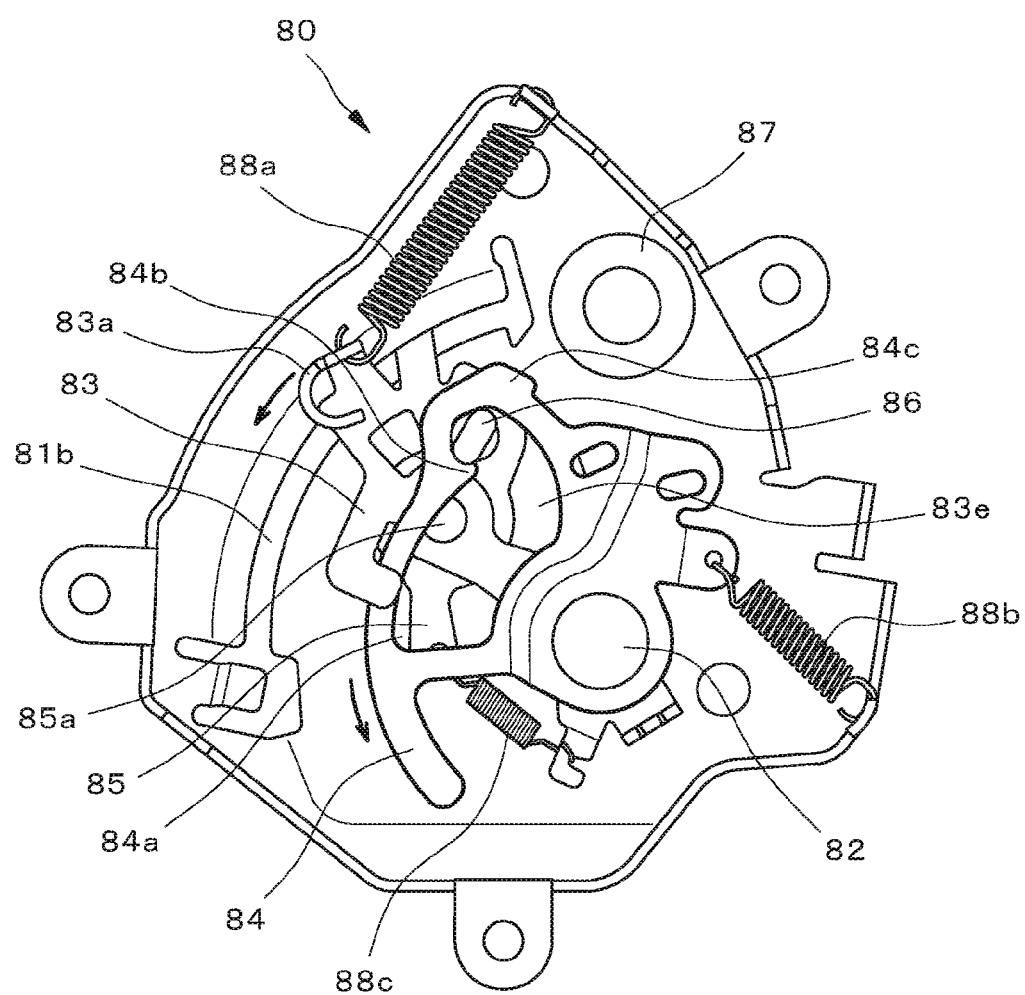
FIG. 15B is a (second) rear view diagram illustrating an operation example of the arrangement unit 80.
Figure 16:
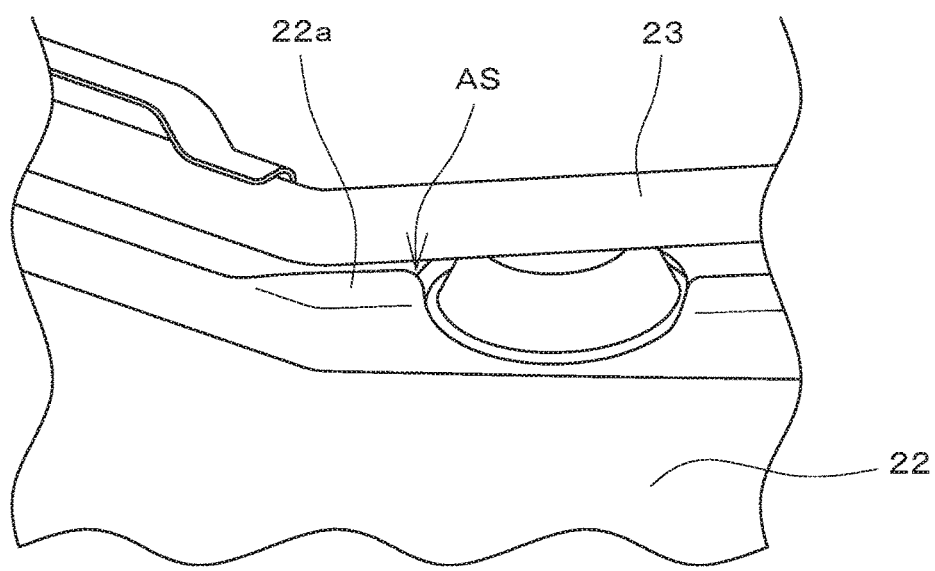

Further, when the third rotation member 85 rotates along with the first rotation member 83 from one end position toward the other end position in the rotation range (in other words, toward the same direction as the direction in which the first rotation member 83 rotates against the biasing force of the first coil spring 88a), the engagement pin 86 is locked to the convex portion 84b of the second rotation member 84 and is engaged with the second rotation member 84 (see FIG. 15B). Accordingly, the engagement pin 86 presses the second rotation member 84 from one end position toward the other end position in the rotation range. That is, in the arrangement unit 80 of this embodiment, when the first rotation member 83 rotates while the second rotation member 84 is engaged with the engagement pin 86, the engagement pin 86 presses the second rotation member 84 by using the rotation of the first rotation member 83, and rotates the second rotation member 84 from one end position toward the other end position in the rotation range against the biasing force of the second coil spring 88b.

The fourth cable C4 is connected to the front end of the engagement pin 86, and the fourth cable C4 is connected to the inclination angle detecting mechanism 130 as described above (see FIG. 5). When the seatback 20 is inclined forward, the engagement pin 86 is pulled toward the vehicle body floor 2. Here, the inclination angle detecting mechanism 130 includes a locking portion (not illustrated) of which one end is locked to the vehicle body floor 2, and the other end of the locking portion is fixed to the seatback frame 21. Then, the inclination angle detecting mechanism 130 is a mechanism that pulls the engagement pin 86 toward the vehicle body floor 2 through the fourth cable C4 along with the operation in which the seatback 20 is inclined forward.

The pulling force in which the inclination angle detecting mechanism 130 pulls the engagement pin 86 increases with an increase in the inclination angle of the seatback 20, and exceeds the locking force between the engagement pin 86 and the convex portion 84b of the second rotation member 84 when the inclination angle reaches a predetermined angle. In such a state, the third rotation member 85 rotates relative to the first rotation member 83 by the pulling force of the fourth cable C4 so that the engagement pin 86 climbs over the apex of the convex portion 84b.

Furthermore, the predetermined angle may be arbitrarily set. For example, the predetermined angle may be set by adjusting the cable length of the fourth cable C4, the shape of the convex portion 84b, and the installation position of the inclination angle detecting mechanism 130.

Then, when the engagement pin 86 climbs over the apex of the convex portion 84b, the second rotation member 84 is canceled from the pressing of the engagement pin 86 and is biased by the second coil spring 88b to return to one end position in the rotation range. Furthermore, when the engagement pin 86 climbs over the apex of the convex portion 84b, the third rotation member 85 rotates again along with the first rotation member 83. Accordingly, the engagement pin 86 moves along the inner edge of the guide hole 84a while facing the opposite side to the position of the convex portion 84b.

The cushioning rubber 87 is a damper which abuts against the protrusion portion 83d of the first rotation member 83 or the protrusion portion 84c of the second rotation member 84 to reduce the impact applied to the respective rotation members when the first rotation member 83 and the second rotation member 84 are biased by the respectively corresponding coil springs 88a and 88b to return to one end position in the rotation range (in the normal position). The cushioning rubber 87 is formed in a cylindrical shape, and is supported by a support shaft 87a uprightly formed on the rear surface of the casing 81. Furthermore, the cushioning rubber 87 according to this embodiment is formed of a rigid rubber material to suppress a collision sound generated by the collision of the first rotation member 83 and the second rotation member 84.

Furthermore, in this embodiment, a coil spring having a comparatively high elastic modulus is used as the first coil spring 88a so that the first rotation member 83 is not erroneously operated by the inertia force generated by, for example, the collision of the vehicle 1. For this reason, the stronger biasing force is applied to the first rotation member 83 when the first rotation member 83 returns to one end position of the rotation range, and the larger impact is applied to the first rotation member 83 when the first rotation member reaches one end position of the rotation range. For this reason, in this embodiment, the effect of the cushioning rubber 87 becomes further effective.

The operation examples of the respective components of the arrangement unit 80 with the above-described configuration will be described by referring to FIGS. 15A to 15D.

In a normal state (when the posture of the vehicle seat S1 is maintained in the sitting posture), as illustrated in FIG. 15A, the first rotation member 83, the second rotation member 84, and the third rotation member 85 are respectively biased by the corresponding springs of the first coil spring 88a, the second coil spring 88b, and the third coil spring 88c to be located at the initial positions.

Here, the initial position of the first rotation member 83 is one end position in the rotation range, and is specifically a position in which the protrusion portion 83d of the first rotation member 83 abuts against the cushioning rubber 87. Similarly, the initial position of the second rotation member 84 is one end position in the rotation range and is specifically a position in which the protrusion portion 84c of the second rotation member 84 abuts against the cushioning rubber 87. The initial position of the third rotation member 85 is a position in which the engagement pin 86 is pressed against the inner edge of the circular-arc hole 83e formed in the first rotation member 83 and is disposed at one end side of the second rotation member 84 in the rotation direction in the guide hole 84a formed in the second rotation member 84.

If the flip-up operation using the seat cushion flipping-up mechanism 60 is performed when the respective rotation members 83, 84, and 85 are present at the respective initial positions, the first cable C1 is pulled toward the link 121 by the rotation of the link 121 connected with the first cable C1. As a result, the first rotation member 83 rotates toward the other end position in the rotation range against the biasing force of the first coil spring 88*a*. At this time, since the engagement pin 86 is pressed against the inner edge of the circular-arc hole 83*e* of the first rotation member 83, the third rotation member 85 rotates along with the first rotation member 83.

When the third rotation member 85 rotates along with the first rotation member 83, the engagement pin 86 moves inside the guide hole 84*a* formed in the second rotation member 84, and is locked to the convex portion 84*b* to be engaged with the second rotation member 84 as illustrated in FIG. 15B. Then, when the first rotation member 83 rotates further toward the other end position in the rotation range, the engagement pin 86 presses the second rotation member 84. The second rotation member 84 rotates from one end position toward the other end position in the rotation range against the biasing force of the second coil spring 88*b* by the pressing force of the engagement pin 86. The second cable C2 and the third cable C3 are pulled by the second rotation member 84.

When the third cable C3 is pulled, the lock piece 73 of the lock mechanism 72 rotates to the un-engageable position as described above so that the engagement state between the lock piece 73 and the striker 74 is canceled. As a result, the seatback 20 is inclined forward by receiving the biasing force of the biasing spring 71. When the seatback 20 is inclined forward, the fourth cable C4 connected to the engagement pin 86 is pulled toward the vehicle body floor 2 by the inclination angle detecting mechanism 130, and the pulling force gradually increases with an increase in the inclination angle of the seatback 20.

Figure 15C:
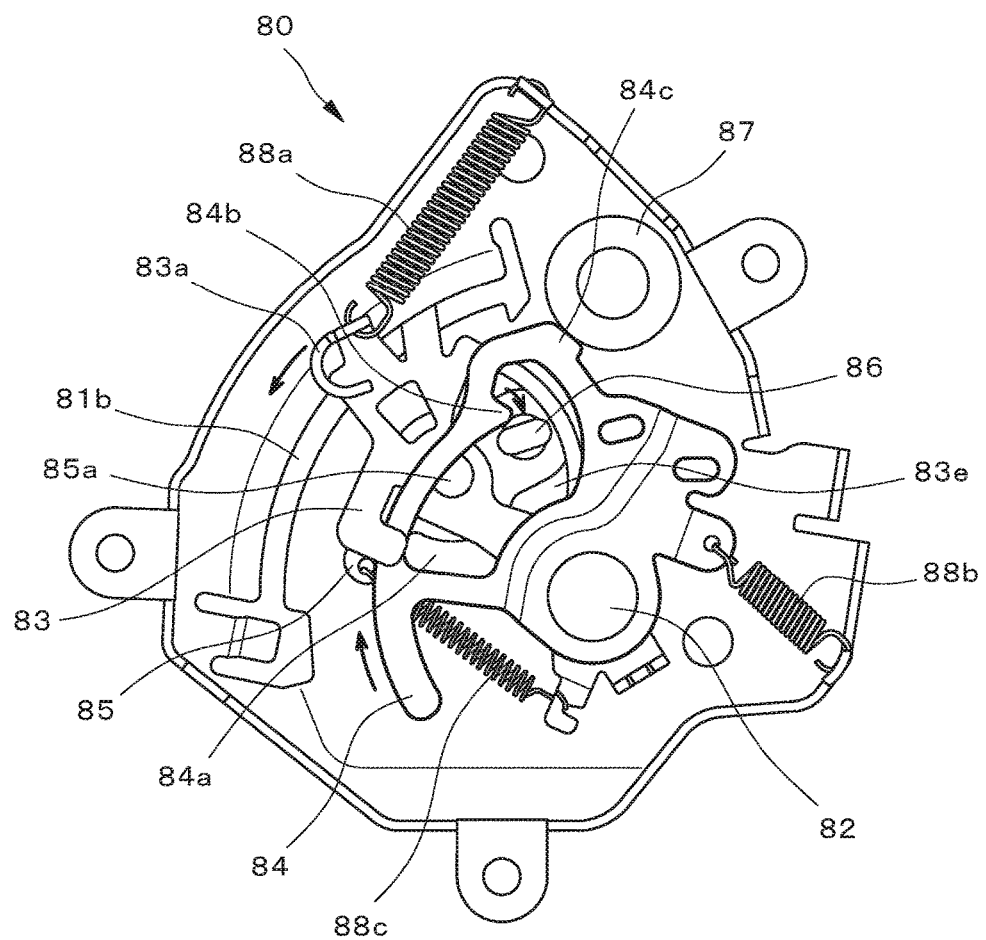
FIG. 15C is a (third) rear view diagram illustrating an operation example of the arrangement unit 80.
Figure 15D:
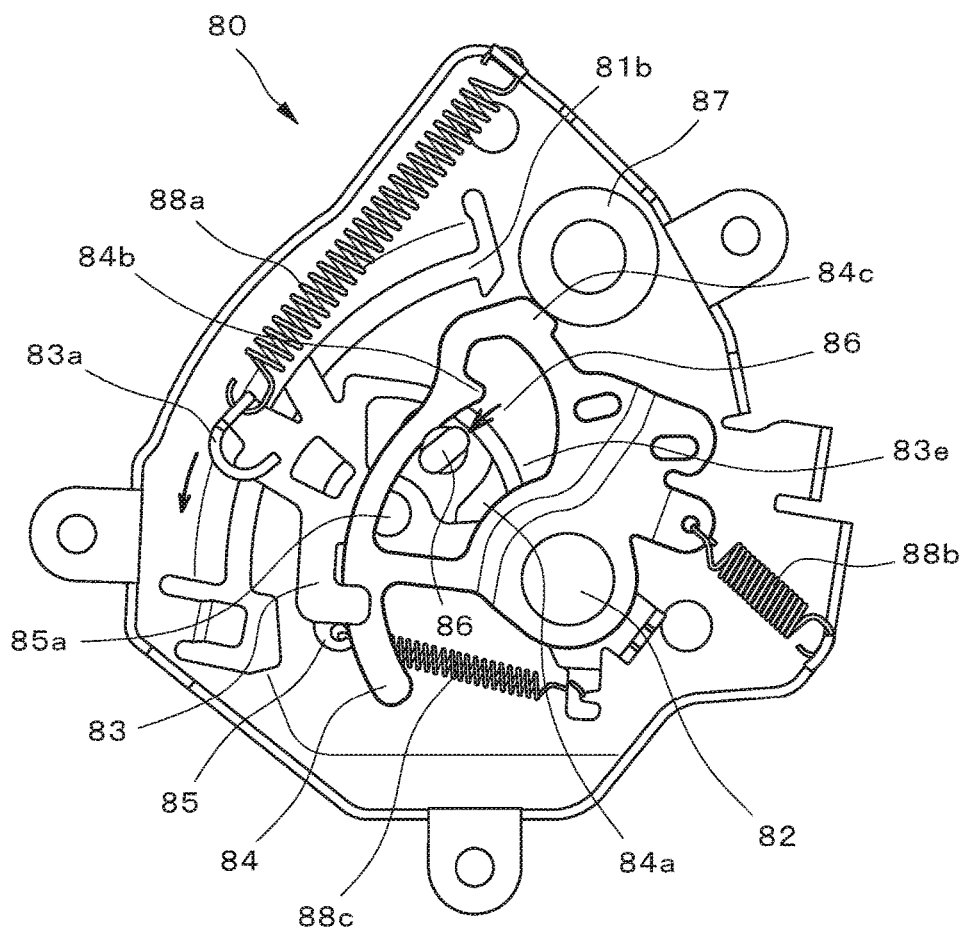
FIG. 15D is a (fourth) rear view diagram illustrating an operation example of the arrangement unit 80.

Then, when the inclination angle of the seatback 20 reaches a predetermined angle, the pulling force acting on the engagement pin 86 exceeds the locking force of the engagement pin 86 and the convex portion 84*b* of the second rotation member 84. In such a state, the third rotation member 85 rotates relative to the first rotation member 83 against the biasing force of the third coil spring 88*c* by the pulling force of the fourth cable C4. By the relative rotation of the third rotation member 85, the engagement pin 86 climbs over the apex of the convex portion 84*b* as illustrated in FIG. 15C. Accordingly, the engagement state between the engagement pin 86 and the second rotation member 84 is canceled, and the second rotation member 84 returns to one end position (that is, the initial position) in the rotation range by the biasing force of the second coil spring 88*b*.

Furthermore, the third rotation member 85 rotates again along with the first rotation member 83 after the engagement pin 86 climbs over the apex of the convex portion 84*b*. Accordingly, the engagement pin 86 moves along the inner edge of the guide hole 84*a* formed in the second rotation member 84 while facing the opposite side to the position of the convex portion 84*b* (see FIG. 15D).

When the second rotation member 84 returns to one end position in the rotation range, the pulling of the second cable C2 and the third cable C3 by the second rotation member 84 is canceled. Accordingly, the lock piece 73 of the lock mechanism 72 rotates to return from the un-engageable position to the engageable position (that is, the striker 74 and the seatback 20 may be engaged with each other again).

That is, in this embodiment, since the engagement pin 86 is continuously locked to the convex portion 84*b* of the second rotation member 84 until the seatback 20 is inclined forward and the inclination angle reaches a predetermined angle, the second rotation member 84 continuously pulls the third cable C3 so that the lock piece 73 connected to the third cable C3 stays at the un-engageable position. That is, since the lock piece 73 is located at the un-engageable position even when the occupant performs an operation of raising the seatback 20 until the seatback 20 is inclined forward and the inclination angle reaches a predetermined angle, the lock piece 73 may not be engaged with the striker 74 to fix the seatback 20 to the sitting position again.

When the inclination angle of the seatback 20 reaches a predetermined angle and the engagement pin 86 climbs over the convex portion 84*b*, the engagement between the engagement pin 86 and the second rotation member 84 is canceled so that the second rotation member 84 returns to one end position in the rotation range. Accordingly, the second rotation member 84 does not pull the third cable C3 thereafter so that the lock piece 73 connected to the third cable C3 is located at the engageable position again. That is, when the occupant performs an operation of raising the seatback 20 after the inclination angle of the seatback 20 reaches a predetermined angle, the lock piece 73 is engaged with the striker 74. Accordingly, the seatback 20 may be fixed (relocked) to the sitting position again.

As described above, in this embodiment, the cancel mechanism 200 is provided which cancels the engagement between the striker 74 and the seatback 20 by using the flip-up operation of the seat cushion flipping-up mechanism 60. The cancel mechanism 200 mainly includes the first rotation member 83, the second rotation member 84, and the engagement pin 86.

Then, when the seat cushion flipping-up mechanism 60 performs the flip-up operation, the first rotation member 83 rotates from one end position toward the other end position of the rotation range against the biasing force of the first coil spring 88*a* by using the flip-up operation. Along with this operation, first, the engagement pin 86 is locked to the convex portion 84*b* to be engaged with the second rotation member 84, and the engagement pin 86 rotates the second rotation member 84 from one end position toward the other end position of the rotation range against the biasing force of the second coil spring 88*b* by the further rotation of the first rotation member 83. In other words, the engagement pin 86 rotates the second rotation member 84 from one end position toward the other end position of the rotation range against the biasing force of the second coil spring 88*b* by using the rotation of the first rotation member 83.

As a result, the seatback inclining mechanism 70 is operated so that the engagement between the striker 74 and the seatback 20 is canceled.

Further, in this embodiment, a return mechanism 210 is provided which performs a return operation (a cancel operation) of returning the seatback 20 of which the engagement with the striker 74 is canceled by the cancel mechanism 200 to the engageable state with respect to the striker 74 during the stowing operation of the vehicle seat S1. Then, in this embodiment, the return operation is performed in accordance with the inclination angle of the seatback 20 inclined forward by the biasing force of the biasing spring 71 after the engagement between the striker 74 and the seatback 20 is canceled. More specifically, the return operation is automatically performed at the time point when the inclination angle reaches the set angle.

More specifically, the return mechanism 210 mainly includes the third rotation member 85, the second coil spring 88b, and the inclination angle detecting mechanism 130. The return mechanism 210 causes the striker 74 and the seatback 20 to be engaged with each other again by returning the second rotation member 84 rotating from one end position toward the other end position of the rotation range to one end position of the rotation range. As described above, the return operation is performed by the action in which the inclination angle detecting mechanism 130 pulls the fourth cable C4 connected to the engagement pin 86 by using the forward inclining operation of the seatback 20 and pulls the engagement pin 86 toward the vehicle body floor 2.

Then, when the pulling force exceeds the locking force between the engagement pin 86 and the convex portion 84b of the second rotation member 84, the third rotation member 85 rotates relative to the first rotation member 83. As a result, the engagement pin 86 moves inside the guide hole 84a to climb over the top portion of the convex portion 84b so that the engagement state with the second rotation member 84 is canceled. The second rotation member 84 of which the engagement with the engagement pin 86 is canceled returns to one end position of the rotation range by the biasing force of the second coil spring 88b. That is, the return operation in this embodiment is an operation which cancels the engagement state between the second rotation member 84 and the engagement pin 86 and returns the position of the second rotation member 84 to one end position of the rotation range by the biasing force of the second coil spring 88b.

Since the lock piece 73 of the seatback inclining mechanism 70 returns to the un-engageable position as a result of the return operation, the striker 74 and the seatback 20 are returned to the engageable state again. Accordingly, when the seatback 20 which is being inclined forward is made to stand until the seatback reaches the sitting position after performing the return operation, the seatback is engaged with the striker 74 at the sitting position to become in a fixed state.

Furthermore, in this embodiment, the engagement between the striker 74 and the seatback 20 is canceled after starting the flip-up operation using the seat cushion flipping-up mechanism 60. Then, the engagement between the striker 74 and the seatback 20 is canceled, and the seatback 20 starts to be inclined forward by the biasing force of the biasing spring 71. Subsequently, the return mechanism 210 performs the return operation at the time point when the inclination angle reaches the predetermined set angle. In this way, in this embodiment, since there is a time difference between the time point of canceling the engagement between the striker 74 and the seatback 20 and the time point of performing the return operation, the return operation is performed, for example, immediately after the engagement between the striker 74 and the seatback 20 is canceled. Accordingly, it is possible to prevent a problem in which the engagement between the striker 74 and the seatback 20 is not appropriately canceled.

Next, the attachment of the arrangement unit 80 will be described. In this embodiment, the respective components of the arrangement unit 80 are not individually attached, but are integrally attached as a unit to the pan frame 22. Here, the attachment stud bolt Bs is attached to the front surface of the pan frame 22 to protrude from the front surface of the pan frame 22 in the previous step of the attachment of the arrangement unit 80. A plurality of bolt receiving portions 81a are provided in the casing 81 of the arrangement unit 80 at an appropriately interval along the outer periphery thereof.

Then, when attaching the arrangement unit 80 to the pan frame 22, the arrangement unit 80 is attached from the front surface side of the pan frame 22 to the bolt hole formed in the bolt receiving portion 81a through the stud bolt Bs. In this way, in this embodiment, the arrangement unit 80 may be attached as one unit, and may be attached from the front surface side of the pan frame 22. Accordingly, the arrangement unit 80 may be easily attached, and hence the assembling workability is improved.

Furthermore, in this embodiment, there are three installation positions of the bolt receiving portion 81a (in other words, the positions in which the arrangement unit 80 is fixed to the pan frame 22), and the respective installation positions are set to be located at the apexes of the triangle. Here, in the triangular region having the apexes as the installation positions of the bolt receiving portions 81a, the operations of the members arranged within the region may be stabilized. Accordingly, when the engagement pin 86 is disposed within the region and the movable range of the engagement pin 86 is set within the region, the engagement pin 86 is stably operated.

Further, in this embodiment, one installation position of the bolt receiving portion 81a is located near the cushioning rubber 87. In other words, the movable member (specifically, the first rotation member 83 and the second rotation member 84) collide with the cushioning rubber 87 in the vicinity of the fixation position of the arrangement unit 80. In this way, since the fixation position of the arrangement unit 80 exists in the vicinity of the position where the collision between the members occurs, a variation in the arrangement position of the arrangement unit 80 is suppressed even when the collision occurs. Accordingly, the arrangement unit 80 may be stably disposed on the pan frame 22. Furthermore, in order to further effectively exhibit the above-described effect, it is more desirable that the arrangement position of the support shaft 87a of the cushioning rubber 87 be disposed on the line connecting the collision position between the operation portion and the cushioning rubber 87 to the installation position of the bolt receiving portion 81a.

Further, in this embodiment, the arrangement unit 80 is attached substantially to the center in the up and down direction of the seatback frame 21. Accordingly, the operation stability of the respective components of the arrangement unit 80 is improved.

Specifically, since the belt-shaped member ST1 which receives the operation of independently inclining the headrest 30 forward is provided at the upper end of the seatback 20, the headrest rotation mechanism 50 which is operated by the operation of pulling the belt-shaped member ST1 is disposed in the vicinity of the upper end of the seatback 20. Further, it is desirable to dispose the arrangement unit 80, which is operated to drive the headrest rotation mechanism 50, in the vicinity of the headrest rotation mechanism 50 (that is, the upper end of the seatback 20) from the viewpoint of the operation stability. The arrangement unit 80 is used to transmit the flip-up operation performed by the seat cushion flipping-up mechanism 60 to the headrest rotation mechanism 50 or the seatback inclining mechanism 70. From this viewpoint, it is desirable to dispose the arrangement unit in the vicinity of the seat cushion 10 (more precisely, the seat cushion flipping-up mechanism 60), that is, the vicinity of the lower end of the seatback 20.

Due to the above-described circumstance, in this embodiment, the arrangement unit 80 is attached to the middle position of the upper end and the lower end of the seatback frame 21, and hence the operation stability of the arrangement unit 80 is improved.

Further, in this embodiment, from the viewpoint of the improvement in the operation stability, the arrangement unit 80 is attached to the position near the outside of the vehicle 1 in the right and left direction (that is, the width direction of the seat back frame 21). This improves the operation stability by a configuration in which the end of the first cable C1 extending from the arrangement unit 80 is attached to the link 121 located at the outside of the vehicle 1 among the pair of links 121 provided in the seat cushion flipping-up mechanism 60 and the cable length is extremely shortened.

The attachment of the arrangement unit 80 will be described further. In this embodiment, the reinforcing plate 26 for improving the rigidity of the pan frame 22 is attached to the position slightly close to the upper side compared to the center of the pan frame 22 in the height direction (corresponding to the up and down direction (the height direction) of the seat back frame 21). Then, the arrangement unit 80 is attached to a portion (that is, a portion with improved rigidity) provided with the reinforcing plate 26 in the pan frame 22 so that a part of the arrangement unit 80 is not caught. Specifically, one of the attachment positions of the arrangement unit 80 (that is, the installation positions of the bolt receiving portions 81a) is located on the reinforcing plate 26. That is, in this embodiment, the arrangement unit 80 is attached to the portion in which the pan frame 22 overlaps the reinforcing plate 26 in the front surface of the pan frame 22, that is, the portion of which the rigidity is further improved.

As described above, the rigidity of the attachment position of the arrangement unit 80 is improved. As a result, it is possible to stabilize the operation of the respective operation portions (specifically, the first rotation member 83 or the second rotation member 84) of the arrangement unit 80. Accordingly, the function of the arrangement unit 80 (the function of transmitting the flip-up operation performed by the seat cushion flipping-up mechanism 60 to the headrest rotation mechanism 50 or the seatback inclining mechanism 70) is appropriately exhibited.

Furthermore, the reinforcing plate 26 has an elongated rectangular shape along the width direction of the seatback frame 21, and one longitudinal end reaches the pipe frame 23 to be bonded to the pipe frame 23. Accordingly, the reinforcing effect obtained by the reinforcing plate 26 is improved, and hence the rigidity of the attachment position of the arrangement unit 80 may be further improved.

Further, in this embodiment, the headrest rotation mechanism 50 is fixed to the pan frame 22 at the upper position of the arrangement unit 80. In this way, since the arrangement unit 80 and the headrest rotation mechanism 50 are arranged in parallel in the vertical direction, the rigidity of the pan frame 22 is further improved.

In addition to the above-described arrangement, the arrangement unit 80 is attached to the pan frame 22 while its upper portion reaches the reinforcing plate 26, and the headrest rotation mechanism 50 is attached to the pan frame 22 while its lower portion reaches the reinforcing plate 26. More specifically, in the up and down direction (the height direction) of the seat back frame 21, the upper end of the reinforcing plate 26 is located at the upper side compared to the upper end of the arrangement unit 80 (precisely, the casing 81 of the arrangement unit 80), and the upper end of the headrest rotation mechanism 50 (precisely, the casing 51 of the headrest rotation mechanism 50) is located at the upper side compared to the upper end of the reinforcing plate 26. That is, the reinforcing plate 26 is provided at a position sandwiched between the headrest rotation mechanism 50 and the arrangement unit 80 in the up and down direction of the seatback frame 21. Accordingly, the rigidity of the pan frame 22 is further improved.

Next, the wiring path of each cable C extending from the arrangement unit 80 will be described by referring to FIG. 5.

Among the cables C extending from the arrangement unit 80, as illustrated in FIG. 5, the first cable C1 connected to the link 121 of the seat cushion flipping-up mechanism 60 is wired to extend from the lower portion of the casing 81 of the arrangement unit 80 and to pass through the substantial center portion of the pan frame 22 in the width direction of the seat back frame 21.

As illustrated in FIG. 5, the second cable C2 connected to the headrest rotation mechanism 50 is wired to extend from the side portion of the casing 81 of the arrangement unit 80 (precisely, the side portion facing the outside of the vehicle 1) and be inclined back so that the front end thereof is directed toward the slide member 54 of the headrest rotation mechanism 50.

As illustrated in FIG. 5, the third cable C3 connected to the seatback inclining mechanism 70 is wired to extend from the side portion of the casing 81 of the arrangement unit 80 (precisely, the side portion facing the outside of the vehicle 1) and to be directed toward the attachment bracket 27 provided at the shoulder position of the seatback frame 21. Then, the third cable C3 is inclined back at the side of the attachment bracket 27, and the front end thereof is connected to the connection portion 76 of the seatback inclining mechanism 70.

As illustrated in FIG. 5, the fourth cable C4 connected to the inclination angle detecting mechanism 130 is wired to extend from the lower portion of the casing 81 of the arrangement unit 80 and to pass through the end facing the outside of the vehicle 1 in the pan frame 22 (corresponding to one end in the width direction of the seat back frame 21). Here, a portion which comes out from the arrangement unit 80 and is connected to the inclination angle detecting mechanism 130 in the fourth cable C4 is bent and stretched along with the operation of inclining the seatback 20 (in FIG. 5, the fourth cable C4 is bent in a V-shape). That is, an extra length portion (so-called allowance) is provided at the halfway position of the fourth cable C4, and the fourth cable is moved (specifically, bent) when the seatback 20 is inclined. In other words, the fourth cable C4 is bent and stretched (flapped) in accordance with the rotation of the seatback 20 in the front to back direction, that is, the inclination of the seatback 20.

As described above, since the bending and stretching operation of the fourth cable C4 is performed on the surface of the seatback frame 21 (the cable flaps), there is a need to ensure a space for accommodating the fourth cable C4 even when the operation of bending and stretching the fourth cable C4 is performed in the seatback frame 21. For this reason, in this embodiment, as illustrated in FIG. 16, the wiring space AS is provided between the side portion facing the outside of the vehicle 1 in the pan frame 22 and the pipe frame 23 located on the side portion. The wiring space AS is a space which accommodates a part of the fourth cable C4 when the fourth cable C4 moves. That is, when the fourth cable C4 moves in accordance with the inclination of the seatback 20, the fourth cable moves to get into under the wiring space AS.

In this embodiment, since the wiring space AS is formed, even when the bending and stretching operation (particularly, the bending operation) of the fourth cable C4 is performed, the fourth cable C4 may be accommodated in the same space to appropriately wire the fourth cable C4. Further, since the wiring space AS is formed, the fourth cable C4 is located below the pipe frame 23 in the bent state, and hence the contact with the pipe frame 23 may be prevented. Accordingly, it is possible to suppress the abnormal noise caused by the contact between the cable C and the pipe frame 23.

Furthermore, the outer edge of the portion forming the wiring space AS in the pan frame 22 (that is, the portion located at the outer edge of the pan frame 22 in one end of the pan frame 22 in the width direction of the seat back frame 21) is provided with a cable returning wall 22a which is formed in an upright wall shape and is an example of the wall. Since the cable returning wall 22a is formed, it is possible to regulate the fourth cable C4 getting into under the wiring space AS from protruding toward the outside of the seat back frame 21. Accordingly, the fourth cable C4 is appropriately wired to be received inside the outer edge of the pan frame 22.

Further, in this embodiment, the wiring space AS is provided at the end closer to the arrangement unit 80 among both ends of the seat back frame 21 in the width direction, that is, the end facing the outside of the vehicle 1. In other words, one end of the pan frame 22 provided with the wiring space AS in the width direction of the seat back frame 21 is closer to the attachment position of the arrangement unit 80 compared to the other end of the pan frame 22. Accordingly, it is possible to further exhibit the effect of the wiring space AS.

Specifically, as described above, the arrangement unit 80 is attached to the position slightly close to the outside of the vehicle 1 in the width direction of the seat back frame 21. Further, there is a need to wire the fourth cable C4 extending from the arrangement unit 80 to the inclination angle detecting mechanism 130 as an extremely short path from the viewpoint of ensuring the operation stability. In consideration of the above-described circumstance, in this embodiment, the fourth cable C4 is wired to pass through the side portion facing the outside of the vehicle 1 in the pan frame 22. Thus, since the flapping of the fourth cable C4 occurs on the end facing the outside of the vehicle 1 in the pan frame 22, when the wiring space AS for absorbing the flapping may be provided at the end facing the outside of the vehicle 1, the effect may be further effectively exhibited.

Effectiveness of the Vehicle Seat According to the Present Embodiment

As described above, the vehicle seat S1 according to this embodiment includes the return mechanism 210 which performs a return operation of returning the seatback 20 of which the engagement with the striker 74 is canceled to the engageable state with respect to the striker 74 other than the cancel mechanism 200. Then, the return mechanism 210 is configured to perform the return operation in accordance with the inclination angle of the seatback 20 that is inclined forward. Particularly, in this embodiment, the return operation is performed at the time point when the inclination angle reaches the predetermined set angle. Accordingly, it is possible to realize the vehicle seat S1 with excellent operability in which the engagement between the striker 74 and the seatback 20 can appropriately be canceled and the striker 74 and the seatback 20 can appropriately be engaged with each other again.

In other words, in the vehicle seat S1 according to this embodiment, the seatback 20 is reliably inclined forward by the biasing force of the biasing spring 71 after the engagement between the striker 74 and the seatback 20 is canceled. The seatback 20 returns to a state where the striker 74 and the seatback 20 may be engaged with each other again at the time point when the inclination angle of the inclined seatback 20 reaches a predetermined angle. Accordingly, even when the seatback 20 is inclined forward after the engagement between the striker 74 and the seatback 20 is canceled by mistake, the striker 74 and the seatback 20 may be returned to the state where both members may be engaged with each other again. That is, in this embodiment, when stowing the vehicle seat S1, the engagement between the striker 74 and the seatback 20 is canceled so that the seatback 20 is reliably inclined forward. Then, even when the seatback 20 is being inclined forward, the striker 74 and the seatback 20 may be engaged with each other again. Accordingly, the operability is improved.

Furthermore, in the vehicle seat S1 according to this embodiment, when the second rotation member 84 provided in the arrangement unit 80 rotates from one end position toward the other end position of the rotation range, the engagement between the striker 74 and the seatback 20 is canceled. Then, when the second rotation member 84 returns to one end position of the rotation range, the striker 74 and the seatback 20 may be engaged with each other again. With such a configuration, it is possible to appropriately switch the state where the engagement between the striker 74 and the seatback 20 is canceled and the state where the striker 74 and the seatback 20 may be engaged with each other again by controlling the position of the second rotation member 84.

Further, the vehicle seat S1 according to this embodiment includes the engagement pin 86 which is engaged with the second rotation member 84 and the second coil spring 88b which biases the second rotation member 84 so that the second rotation member is directed toward one end position of the rotation range. Then, when the first rotation member 83 rotates while the second rotation member 84 is engaged with the engagement pin 86, the engagement pin 86 rotates the second rotation member 84 from one end position toward the other end position of the rotation range against the biasing force of the second coil spring 88b by using the rotation of the first rotation member 83. Subsequently, when the engagement state between the second rotation member 84 and the engagement pin 86 is canceled, the position of the second rotation member 84 returns to one end position of the rotation range by the biasing force of the second coil spring 88b. That is, in this embodiment, the return mechanism 210 performs a return operation of canceling the engagement state between the engagement pin 86 and the second rotation member 84 rotating toward the other end position of the rotation range by the engagement pin 86.

With such a configuration, in this embodiment, it is possible to control the position of the second rotation member 84 by adjusting the mechanical configuration as the engagement state between the second rotation member 84 and the engagement pin 86. As a result, it is possible to switch the state where the engagement between the striker 74 and the seatback 20 is canceled and the state where the striker 74 and the seatback 20 may be engaged with each other by a comparatively simple configuration.

Further, in the vehicle seat S1 according to this embodiment, the convex portion 84b is formed at the portion where the edge of the guide hole 84a is located in the second rotation member 84, and the engagement pin 86 is engaged with the convex portion 84b to be engaged with the second rotation member 84. Further, the vehicle seat S1 according to this embodiment includes the inclination angle detecting mechanism 130 which pulls the engagement pin 86 so that the engagement pin 86 climbs over the convex portion by using the forward inclining operation of the seatback 20.

Then, the pulling force of the inclination angle detecting mechanism 130 exceeds the locking force of the engagement pin 86 and the convex portion 84b at the time point when the inclination angle of the seatback 20 reaches the set angle so that the engagement pin 86 climbs over the convex portion 84b.

With such a configuration, in this embodiment, it is possible to switch the engagement state between the second rotation member 84 and the engagement pin 86 by a comparatively simple configuration. Further, it is possible to adjust the time point when the engagement pin 86 climbs over the convex portion 84b by adjusting the shape of the convex portion 84b.

Other Embodiments

In the above-described embodiment, the vehicle seat S1 has been described as an example of the conveyance seat of the present invention. However, the above-described embodiment is used to help the understanding of the present invention, and does not limit the present invention. The present invention may be modified and improved without departing from the spirit thereof, and the equivalent thereof is, of course, included in the present invention. Further, the above-described material or shape is merely an example for exhibiting the effect of the present invention, and does not limit the present invention.

Further, in the above-described embodiment, the vehicle seat S1 has been described which is stowed in a manner such that the seatback 20 is inclined forward along with the operation of flipping up the seat cushion 10 and the headrest 30 is inclined forward by about 90°. However, the present invention is not limited thereto, and a vehicle seat may be employed which is stowed in a manner such that the seatback 20 is inclined forward onto the seat cushion 10 without flipping up the seat cushion 10 and the headrest 30 is inclined forward by about 90°.

Further, in the above-described embodiment, the headrest rotation mechanism 50 and the arrangement unit 80 respectively include individual casings 51 and 81, and the attachment positions of the respective casings 51 and 81 to the seatback frame 21 are set to be different from each other. However, the present invention is not limited thereto, and the attachment position of the casing 51 of the headrest rotation mechanism 50 and the attachment position of the casing 81 of the arrangement unit 80 may be the same position. In other words, the bolt receiving portion 51a provided in the casing 51 of the headrest rotation mechanism 50 and the bolt receiving portion 81a provided in the casing 81 of the arrangement unit 80 may receive the same stud bolt Bs to be simultaneously fixed by the stud bolt Bs.

Further, a configuration may be employed in which the headrest rotation mechanism 50 and the arrangement unit 80 share the casing (that is, the casing 51 of the headrest rotation mechanism 50 and the casing 81 of the arrangement unit 80 are integrated with each other).

TABLE OF REFERENCE NUMERALS

| 1 | vehicle | |
|---|---|---|
| 2 | vehicle body floor | |
| 3 | luggage compartment part | |
| 10 | seat cushion | |
| | 10a | projection portion |
| 11 | cushion frame | |
| 20 | seatback | |
| | 20a | pedestal portion |
| | 20b | rotation shaft |
| 21 | seatback frame | |
| 22 | pan frame | |
| | 22a | cable returning wall |
| 23 | pipe frame | |
| 24 | hook rod | |
| 25 | pillar inclination regulating portion | |
| 26 | reinforcing plate | |
| 27 | attachment bracket | |
| 30 | headrest | |
| 31 | inner frame | |
| | 31a | leg portion |
| | 31b | lower end flange portion |
| 32 | guide | |
| | 32a | lower end flange |
| 33 | pillar | |
| | 33a | vertical portion |
| | 33b | horizontal portion, pillar connection portion |
| | 33c | pillar side engagement portion, plate-shaped member |
| | 33d | notch |
| | 33e | shaft |
| 35 | headrest support member | |
| 40 | armrest | |
| 50 | headrest rotation mechanism | |
| 51 | casing | |
| | 51a | bolt receiving portion |
| 52 | biasing spring | |
| 53 | lock member | |
| 54 | slide member | |
| | 54a | one longitudinal end |
| | 54b | extension portion |
| 60 | seat cushion flipping-up mechanism | |
| 70 | seatback inclining mechanism | |
| 71 | biasing spring | |
| | 71a | one end |
| | 71b | the other end |
| 72 | lock mechanism | |
| 73 | lock piece | |
| 74 | striker | |
| 75 | base portion | |
| 76 | connection portion | |
| | 76a | lower end |
| | 76b | upper end |
| 77 | operation unit | |
| | 77a | operation cover |
| | 77b | operation lever |
| | 77c | connecting rod |
| 80 | arrangement unit | |
| 81 | casing | |
| | 81a | bolt receiving portion |
| | 81b | guide slit |
| | 81c | center region |
| | 81d | outer region |
| 82 | rotation shaft | |
| 83 | first rotation member | |
| | 83a | cable locking portion |
| | 83b | tongue-shaped portion |
| | 83c | tongue-shaped engagement portion |
| | 83d | protrusion portion |
| | 83e | circular-arc hole |

-continued

TABLE OF REFERENCE NUMERALS

| | | | |
|---|---|---|---|
| 84 | second rotation member | | |
| | 84a | guide hole | |
| | 84b | convex portion | |
| | 84c | protrusion portion | |
| | 84d | outermost edge | |
| | 84e | connection hole | |
| 85 | third rotation member | | |
| | 85a | rotation shaft | |
| 86 | engagement pin | | |
| 87 | cushioning rubber | | |
| | 87a | support shaft | |
| | 88a | first coil spring | |
| | 88b | second coil spring | |
| | 88c | third coil spring | |
| 90 | seatback supporting unit | | |
| 91 | locking pin | | |
| 100 | striker lock mechanism | | |
| 101 | locking portion | | |
| 102 | lock piece | | |
| 103 | housing | | |
| 104 | connection piece | | |
| 105 | striker | | |
| 110 | attachment unit | | |
| 111 | attachment plate | | |
| 112 | first plate portion | | |
| | 112a | upright wall portion | |
| | 112b | slit | |
| | 112c | path defining portion | |
| 113 | second plate portion | | |
| 114 | attachment hole | | |
| | 114a | front end | |
| | 114b | center portion | |
| | 114c | rear end | |
| 115 | submarine bracket | | |
| 120 | movable unit | | |
| 121 | link | | |
| | 121a | abutting portion | |
| | 121b | insertion hole | |
| 122 | pipe rod | | |
| 123 | connection bar | | |
| 124 | attachment bracket | | |
| 125 | support mechanism | | |
| 126A, 126B | rotation shaft | | |
| 127 | base bracket | | |
| | 127a | upright wall portion | |
| 128 | spiral spring | | |
| 129 | damper rubber | | |
| 130 | inclination angle detecting mechanism | | |
| 200 | cancel mechanism | | |
| 210 | return mechanism | | |
| AS | wiring space | | |
| Bo | bolt | | |
| Bs | stud bolt | | |
| C | cable | | |
| C1 | first cable | | |
| C2 | second cable | | |
| C3 | third cable | | |
| C4 | fourth cable | | |
| S1, S11, S12 | vehicle seat | | |
| ST1 | belt-shaped member | | |
| ST2 | stowing operation belt-shaped member | | |
| Ws | washer | | |

The invention claimed is:

1. A conveyance seat comprising:
a seat back frame;
a headrest which is provided above the seat back frame;
a headrest support member which supports the headrest; and
a rotation mechanism which supports the headrest support member in a rotatable manner, wherein:
the headrest support member comprises:
two vertical portions, each of which extends in an up and down direction of the seat back frame, and
a pillar connection portion which connects the two vertical portions;
the rotation mechanism comprises:
a biasing spring which is adjacent to the pillar connection portion and disposed in a parallel manner to the pillar connection portion, and
two plate-shaped members, each of which extends from the pillar connection portion toward the biasing spring; and
the biasing spring is located between the two plate-shaped members;
each of the two vertical portions is curved one of inward or outward in a seat width direction at a curved portion between an upper end and a lower end of the vertical portion and extends, from the curved portion, in a direction not in parallel with the other of the two vertical portions such that a tip portion of each of the two vertical portions is offset in the seat width direction from a connection portion of the vertical portion that is connected to the pillar connection portion, wherein the tip portions are at the respective ends of the two vertical portions that are opposite the ends of the vertical portions at which the pillar connection portion connects the two vertical portions; and
the two plate-shaped members are disposed between the tip portions of the vertical portions in the seat width direction.

2. The conveyance seat according to claim 1, wherein:
when the headrest stands above the seatback, the biasing spring is located on a first side of the pillar connection portion and the vertical portions extend toward a second side of the pillar connection portion, the first side and the second side being opposite to each other.

3. The conveyance seat according to claim 1, wherein:
a distance in a horizontal direction between the two plate-shaped members is smaller than a distance in a horizontal direction between the two vertical portions.

4. The conveyance seat according to claim 1, wherein:
the biasing spring is located within a range of a width of at least one of the plate-shaped members in a side view.

5. The conveyance seat according to claim 1, wherein:
the biasing spring is a coil spring; and
a first end of the coil spring is engaged with one of the plate-shaped members.

6. The conveyance seat according to claim 5, wherein:
when the headrest stands above the seatback, a second end of the coil spring extends to a first side of the pillar connection portion and the vertical portions extend toward a second side of the pillar connection portion, the first side and the second side being opposite to each other.

7. The conveyance seat according to claim 5, wherein:
the coil spring is mounted on a shaft which is provided between the two plate-shaped members; and
the shaft is parallel to the pillar connection portion.

8. The conveyance seat according to claim 7, wherein:
when the headrest stands above the seatback, the shaft is located on a first side of the pillar connection portion and the vertical portions extend toward a second side of the pillar connection portion, the first side and the second side being opposite to each other.

* * * * *